United States Patent
Erickson et al.

(10) Patent No.: US 9,757,740 B2
(45) Date of Patent: Sep. 12, 2017

(54) MULTI-FUNCTION SPRAYHEAD

(71) Applicant: Kohler Co., Kohler, WI (US)

(72) Inventors: Perry D. Erickson, Sheboygan, WI (US); Steven Thomas Radder, Kiel, WI (US)

(73) Assignee: KOHLER CO., Kohler, WI (US)

( * ) Notice: Subject to any disclaimer, the term of this patent is extended or adjusted under 35 U.S.C. 154(b) by 269 days.

(21) Appl. No.: 14/547,913

(22) Filed: Nov. 19, 2014

(65) Prior Publication Data
US 2016/0136659 A1    May 19, 2016

(51) Int. Cl.
| | |
|---|---|
| B05B 1/12 | (2006.01) |
| F16K 11/20 | (2006.01) |
| F16K 27/04 | (2006.01) |
| B05B 1/16 | (2006.01) |
| B05B 1/18 | (2006.01) |

(Continued)

(52) U.S. Cl.
CPC .............. B05B 1/12 (2013.01); B05B 1/169 (2013.01); B05B 1/1618 (2013.01); B05B 1/18 (2013.01); B05B 1/3013 (2013.01); E03C 1/0405 (2013.01); F16K 11/20 (2013.01); F16K 27/04 (2013.01); *E03C 2001/0415* (2013.01); *E03C 2201/30* (2013.01)

(58) Field of Classification Search
CPC ......... B05B 1/12; B05B 1/1618; B05B 1/169; B05B 1/18; B05B 1/3013; B05B 15/061; B05B 1/1627; B05B 1/1636; B05B 1/1681; F16K 11/20; F16K 27/04; E03C 1/0405; E03C 2201/30; E03C 2001/0415

USPC .......... 239/436–449, 586, 525, 530; 137/614
See application file for complete search history.

(56) References Cited

U.S. PATENT DOCUMENTS

| | | |
|---|---|---|
| 3,346,148 A | 10/1967 | Weese |
| 3,739,983 A | 6/1973 | Jousson |

(Continued)

FOREIGN PATENT DOCUMENTS

| | | |
|---|---|---|
| CA | 2155433 A1 | 7/1994 |
| CN | 201651426 U | 11/2010 |

(Continued)

OTHER PUBLICATIONS

European Search Report and Search Opinion for Application No. EP 14150082, dated Apr. 7, 2014, 5 pages.

*Primary Examiner* — Arthur O Hall
*Assistant Examiner* — Juan C Barrera
(74) *Attorney, Agent, or Firm* — Foley & Lardner LLP

(57) ABSTRACT

A fluid control valve including a body, a first diverter, and a second diverter. The body includes an inlet that receives a supply of fluid, and first, second and third chambers. The first diverter is movable between first and second positions. When the first diverter is in the second position, the first chamber is fluidly connected to the inlet and the second chamber is fluidly disconnected from the inlet. When the first diverter is in the first position, the second chamber is fluidly connected to the inlet and the first chamber is fluidly disconnected from the inlet. The second diverter is movable between first and second positions. When the second diverter is in the second position, the third chamber is fluidly connected to the second chamber. When the second diverter is in the first position, the third chamber is fluidly disconnected from the second chamber.

19 Claims, 20 Drawing Sheets

(51) Int. Cl.
B05B 1/30 (2006.01)
E03C 1/04 (2006.01)

(56) References Cited

U.S. PATENT DOCUMENTS

| | | |
|---|---|---|
| 4,130,120 A | 12/1978 | Kohler, Jr. |
| 4,617,965 A | 10/1986 | Lorch |
| 4,651,770 A | 3/1987 | Denham et al. |
| 4,794,952 A | 1/1989 | Burkard |
| 4,997,005 A | 3/1991 | Pawelzik et al. |
| 5,022,429 A | 6/1991 | Rollini et al. |
| 5,103,856 A | 4/1992 | Fleischmann |
| 5,127,111 A | 7/1992 | Sieth |
| 5,201,468 A | 4/1993 | Freier et al. |
| 5,205,490 A | 4/1993 | Steinhardt et al. |
| 5,253,811 A | 10/1993 | Sieth |
| 5,299,743 A | 4/1994 | Sieth et al. |
| 5,361,431 A | 11/1994 | Freier et al. |
| 5,575,424 A | 11/1996 | Fleischmann |
| 5,577,664 A | 11/1996 | Heitzman |
| 5,608,927 A | 3/1997 | Lowry et al. |
| 5,752,541 A | 5/1998 | Gonzalez |
| 5,772,120 A | 6/1998 | Huber |
| 5,806,771 A | 9/1998 | Loschelder et al. |
| 5,918,811 A | 7/1999 | Denham et al. |
| 5,961,046 A | 10/1999 | Joubran |
| 6,134,722 A | 10/2000 | Lowry et al. |
| 6,202,693 B1 | 3/2001 | Bollo |
| 6,233,757 B1 | 5/2001 | Graham et al. |
| 6,234,192 B1 | 5/2001 | Esche et al. |
| 6,296,011 B1 | 10/2001 | Esche et al. |
| 6,367,710 B2 | 4/2002 | Fan |
| 6,533,194 B2 | 3/2003 | Marsh et al. |
| 6,607,148 B1 | 8/2003 | Marsh et al. |
| 6,634,380 B2 | 10/2003 | Bartkus et al. |
| 6,659,372 B2 | 12/2003 | Marsh et al. |
| 6,757,921 B2 | 7/2004 | Esche |
| 6,959,731 B2 | 11/2005 | Bartkus et al. |
| 7,070,125 B2 | 7/2006 | Williams et al. |
| 7,134,614 B2 | 11/2006 | Miyake et al. |
| 7,322,535 B2 | 1/2008 | Erdely |
| 7,344,094 B1 | 3/2008 | Tracy et al. |
| 7,373,950 B2 | 5/2008 | Huang |
| 7,455,247 B2 | 11/2008 | Kajuch |
| 7,487,797 B2 | 2/2009 | Di Nunzio |
| 7,494,074 B2 * | 2/2009 | Benstead ............... B05B 1/1618 239/11 |
| 7,578,453 B1 | 8/2009 | Wilson |
| 7,628,341 B2 | 12/2009 | Kajuch |
| 7,753,074 B2 | 7/2010 | Rosko et al. |
| 7,762,479 B2 | 7/2010 | Li |
| 7,770,820 B2 | 8/2010 | Clearman et al. |
| 7,770,825 B2 | 8/2010 | Kajuch |
| 7,789,326 B2 | 9/2010 | Luettgen et al. |
| 7,871,020 B2 | 1/2011 | Nelson et al. |
| 7,909,269 B2 | 3/2011 | Erickson et al. |
| 8,070,076 B2 | 12/2011 | Erickson et al. |
| 8,113,442 B2 | 2/2012 | Li et al. |
| 8,360,346 B2 | 1/2013 | Furseth |
| 8,448,667 B2 * | 5/2013 | Meehan ............... E03C 1/0404 137/637.1 |
| 8,708,257 B2 * | 4/2014 | Gautschi ............... B05B 1/1681 239/525 |
| 8,733,674 B2 | 5/2014 | Kajuch |
| 8,863,769 B2 | 10/2014 | Andersen et al. |
| 8,876,023 B2 | 11/2014 | Peel et al. |
| 9,259,747 B2 | 2/2016 | Erickson |
| 2001/0023901 A1* | 9/2001 | Haverstraw ............. B05B 1/044 239/443 |
| 2002/0148516 A1 | 10/2002 | Bartkus et al. |
| 2004/0227014 A1* | 11/2004 | Williams ............... B05B 1/1618 239/443 |
| 2005/0001072 A1 | 1/2005 | Bolus et al. |
| 2007/0194148 A1* | 8/2007 | Rosko ................... B05B 1/1609 239/526 |
| 2007/0246577 A1 | 10/2007 | Leber |
| 2008/0023577 A1 | 1/2008 | Zhen et al. |
| 2008/0067264 A1* | 3/2008 | Erickson ............... B05B 1/1618 239/445 |
| 2008/0105764 A1 | 5/2008 | Jianglin |
| 2008/0156902 A1 | 7/2008 | Luettgen et al. |
| 2009/0236438 A1 | 9/2009 | Petrovic |
| 2009/0308951 A1* | 12/2009 | Suter ................... A01K 13/001 239/318 |
| 2010/0006169 A1 | 1/2010 | Bolgar et al. |
| 2010/0125946 A1 | 5/2010 | Meisner et al. |
| 2010/0276518 A1 | 11/2010 | Kajuch |
| 2011/0147477 A1 | 6/2011 | Mang |
| 2011/0198415 A1 | 8/2011 | Ukigai et al. |
| 2011/0198416 A1 | 8/2011 | Ukigai et al. |
| 2011/0284662 A1 | 11/2011 | Ohashi et al. |
| 2012/0267455 A1 | 10/2012 | Hansen |
| 2013/0193237 A1 | 8/2013 | Erickson |
| 2014/0026980 A1 | 1/2014 | Esche et al. |
| 2014/0069511 A1 | 3/2014 | Rexach et al. |
| 2014/0069520 A1 | 3/2014 | Esche et al. |
| 2014/0263760 A1 | 9/2014 | Hanna et al. |

FOREIGN PATENT DOCUMENTS

| | | |
|---|---|---|
| CN | 102160765 | 8/2011 |
| CN | 102161023 | 8/2011 |
| CN | 102316778 | 1/2012 |
| DE | 28 43 666 A1 | 4/1980 |
| DE | 4118540 | 12/1992 |
| EP | 0 688 607 A1 | 12/1995 |
| EP | 2 359 726 A1 | 8/2011 |
| EP | 2 361 688 A1 | 8/2011 |
| EP | 2 361 689 A1 | 8/2011 |
| JP | 2010-162356 | 7/2010 |
| JP | 2010-162532 | 7/2010 |
| JP | 2010-162534 | 7/2010 |
| JP | 2010-162535 | 7/2010 |
| JP | 04-623329 | 2/2011 |
| JP | 2011-167355 | 9/2011 |
| JP | 2011-167640 | 9/2011 |
| WO | WO-94/07065 | 3/1994 |
| WO | WO-95/17971 | 7/1995 |
| WO | WO-01/70904 | 9/2001 |

\* cited by examiner

MULTI-FUNCTION SPRAYHEAD

BACKGROUND

The present disclosure relates generally to the field of valves for directing fluids to multiple outlets. More specifically, the disclosure relates to sprayhead assemblies for use in faucets for directing fluid (e.g., water) to one or more outlets to thereby provide multiple functions of the sprayhead.

Faucets may include a body and a sprayhead from which water is emitted. Conventional sprayheads may include a valve for switching between two functions, for example, aerated and non-aerated water streams. There is a need for an improved valve to distribute water between functional outlets. There is a further need for a valve that provides a sprayhead having more than two functions.

SUMMARY

An embodiment relates to a fluid control valve including a body, a first diverter, and a second diverter. The body includes an inlet configured to receive a supply of fluid, a first chamber, a second chamber, and a third chamber. The first diverter is movable relative to the body between a first position and a second position. When the first diverter is in the second position, the first chamber is fluidly connected to the inlet and the second chamber is fluidly disconnected from the inlet. When the first diverter is in the first position, the second chamber is fluidly connected to the inlet and the first chamber is fluidly disconnected from the inlet. The second diverter is movable relative to the body between a first position and a second position. When the second diverter is in the second position, the third chamber is fluidly connected to the second chamber. When the second diverter is in the first position, the third chamber is fluidly disconnected from the second chamber.

The body of the fluid control valve may further include a first outlet fluidly connected to the first chamber; a second outlet; and/or a third outlet fluidly connected to the third chamber. When the second diverter is in the first position, the second outlet may be fluidly connected to the second chamber. When the second diverter is in the second position, the second outlet may be fluidly disconnected from the second chamber.

The fluid control valve may be configured such that at least a portion of the second diverter is disposed in a portion of the third chamber that extends in a longitudinal direction through the body, such that the second diverter moves in the longitudinal direction between the first and second positions.

The fluid control valve may be configured such that the first chamber of the body includes a first portion that receives at least a portion of the first diverter and a second portion that is fluidly connected to the first outlet. The first portion of the first chamber may extend in a radial direction that is transverse to the longitudinal direction, such that the first diverter moves in the radial direction between the first and second positions. The second portion of the first chamber may extend at an angle relative to the first portion.

The fluid control may further include a biasing member that biases the first diverter. For example, the biasing member may bias the first diverter from its second position toward its first position.

The fluid control valve may be configured such that the first diverter has a first end configured to couple to a first actuator and a second end having a bore that receives a post of the body. The biasing member may be disposed in the bore between the post and the second end of the first diverter.

The fluid control valve may further include a sealing member. For example, a sealing member may be disposed in a channel of a shoulder on the second end of the first diverter. When the first diverter is in the second position, the second chamber is fluidly disconnected from the inlet by the sealing member and first diverter. When the first diverter is in the first position, the first chamber is fluidly disconnected from the inlet by the sealing member and the first diverter.

The fluid control valve may be configured such that the second diverter includes a first end and a second opposing end. The second end may be configured to couple to a second actuator, which is configured to move the second diverter between the first and second positions.

The fluid control valve may further include a sealing member, such as a second sealing member. The sealing member may be disposed in a channel of a shoulder on the first end of the second diverter. When the second diverter is in the second position, the second outlet is fluidly disconnected from the second chamber by the sealing member and the second diverter. When the second diverter is in the first position, the third chamber is fluidly disconnected from the second chamber by the sealing member and the second diverter.

Another embodiment relates to a sprayhead for directing a fluid. The sprayhead includes a fluid control valve, a first outlet member, a second outlet member, and a third outlet member. The valve includes a body having an inlet configured to receive the fluid, a first chamber, a second chamber, and a third chamber. The valve also includes a first diverter and a second diverter. The first diverter is movable between a first position and a second position. When the first diverter is in the second position, the first chamber is fluidly connected to the inlet and the second chamber is fluidly disconnected from the inlet. When the first diverter is in the first position, the second chamber is fluidly connected to the inlet and the first chamber is fluidly disconnected from the inlet. The second diverter is movable between a first position and a second position. When the second diverter is in the second position, the third chamber is fluidly connected to the second chamber. When the second diverter is in the first position, the third chamber is fluidly disconnected from the second chamber. The first outlet member includes a first plurality of nozzles that receive the fluid from the first chamber. The second outlet member includes at least one nozzle that is fluidly connected to the second chamber when the second diverter is in the first position. The third outlet member includes a second plurality of nozzles that receive the fluid from the third chamber. The first plurality of nozzles provide a first function, the at least one nozzle of the second outlet member provides a second function different than the first function, and the second plurality of nozzles provide a third function different than the first and second functions.

The sprayhead may be configured such that at least a portion of the second diverter is disposed in a portion of the third chamber that extends in a longitudinal direction through the body, such that the second diverter moves in the longitudinal direction; and where at least a portion of the first diverter is disposed in a portion of the first chamber, such that the first diverter moves in a radial direction that is transverse to the longitudinal direction.

The sprayhead may further include a first actuator and/or a second actuator. The first actuator may control the movement of the first diverter, such as in the radial direction between the first and second positions. The second actuator may control the movement of the second diverter, such as in the longitudinal direction between the first and second positions.

If provided, the first actuator may be movable in the radial direction to control the movement of the first diverter. If provided, the second actuator may be pivotally coupled to the body, such that a rotation of the second actuator moves the second diverter in the longitudinal direction.

The sprayhead may be configured such that the second outlet member is aligned with the second diverter, the first outlet member is provided radially outward from and around the second outlet member, and the third outlet member is provided radially outward from and around the first outlet member. The third outlet member may be removable (e.g., detachable) from the sprayhead.

The sprayhead may further include a casing. The casing may have an outer wall that defines a cavity for receiving the body therein. The outer wall may have a first opening at a first end and a second opening at a second opposing end. An end of the body including the inlet may be configured to extend through the first opening. The first, second, and third outlet members may be provided in the second opening.

The third outlet member may be configured to include external threads that mesh with internal threads of the outer wall of the casing to detachably couple the third outlet member to the casing.

The first outlet member may be configured to include a tab that engages a recess of the body to couple the first outlet member to the body.

Yet another embodiment relates to a fluid control valve including a body and a diverter. The body includes a base having an opening, a first wall, a second wall, a third wall, and a hollow fourth wall. The first wall extends from the base, such that the first wall is provided around the opening. The second wall is provided around the first wall, such that a second opening is disposed between a portion of the first wall and a portion of the second wall. The third wall extends from the second wall, where a third opening is disposed between the second and third walls. The fourth wall is provided within at least the third wall and defining a first internal chamber and a second external chamber, the internal chamber being fluidly connected to the third opening. The diverter is movable between a first position and a second position. When the diverter is in the first position, the opening is fluidly connected to the external chamber and the internal chamber is fluidly disconnected from the external chamber. When the diverter is in the second position, the internal chamber is fluidly connected to the external chamber and the opening is fluidly disconnected to the external chamber.

The body of the sprayhead may further include a fifth wall provided between the third and fourth walls, such that at least a portion of the external chamber is provided between the fourth and fifth walls. A portion of the fifth wall may be configured to abut (e.g., contact) at least a portion of the third wall. A seal may be disposed between the fifth and third walls.

The sprayhead may further include a second diverter that is disposed in a cavity defined by a sixth wall. The second diverter is movable between a first position, in which an inlet is fluidly connected to the external chamber, and a second position, in which the inlet is fluidly connected to the second opening.

The sprayhead may be configured such that the first wall has a circular shape, the second wall has an elliptical shape, the third wall has an elliptical shape, and the fourth wall has a circular shape.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
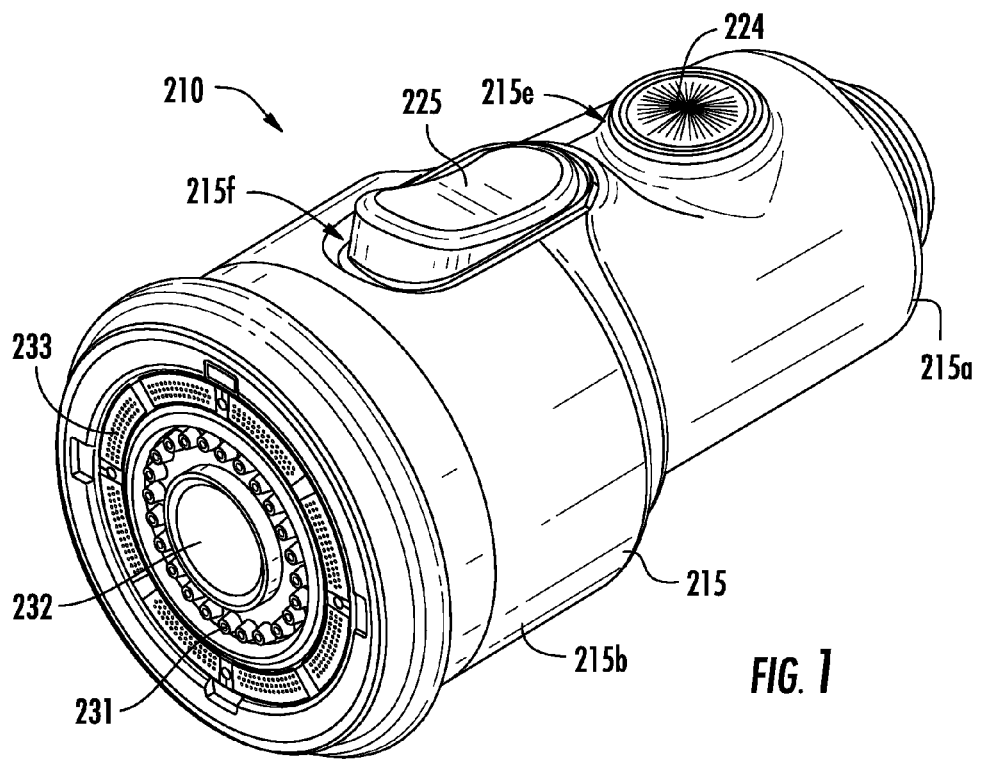
FIG. 1 is a front perspective view of an exemplary embodiment of a sprayhead.

Referring generally to the FIGURES, disclosed herein are sprayheads configured to provide multiple spray functions. The sprayheads may be configured for use with faucets or may be separate sprayers (e.g., side sprayers). The sprayhead includes a valve (e.g., a fluid control valve) having one or more chambers. For example, the valve may include a body that defines a first chamber, a second chamber, and a third chamber. The sprayhead also includes an inlet configured to receive a supply of fluid (e.g., water). For example, the body may include the inlet. The valve also includes at least one diverter. For example, the valve may include a first diverter and a second diverter. The first diverter is movable between a first position and a second position. According to an exemplary embodiment, when the first diverter is in the second position, the first chamber is fluidly connected to the inlet and the second chamber is fluidly disconnected from the inlet; and when the first diverter is in the first position, the second chamber is fluidly connected to the inlet and the first chamber is fluidly disconnected from the inlet. The second diverter is movable between a first position and a second position. According to an exemplary embodiment, when the second diverter is in the second position, the third chamber is fluidly connected to the second chamber; and wherein when the second diverter is in the first position, the third chamber is fluidly disconnected from the second chamber. The valve, such as the body, may include one or more outlets. For example, the body may include a first outlet, a second outlet, and a third outlet. The first outlet may be fluidly connected to the first chamber and the third outlet may be fluidly connected to the third chamber. According to an exemplary embodiment, when the second diverter is in the first position, the second outlet is fluidly connected to the second chamber, and when the second diverter is in the second position, the second outlet is fluidly disconnected from the second chamber.

The sprayhead may include one or more outlet members, where each outlet member is configured to provide a different spray function (e.g., mode of operation). For example, the sprayhead may include a first outlet member, a second outlet member, and a third outlet member. The first outlet member may include a first plurality of nozzles that receive the fluid from the first chamber. The second outlet member may include at least one nozzle that is fluidly connected to the second chamber when the second diverter is in the first position. The third outlet member may include a second plurality of nozzles that receive the fluid from the third chamber. The first plurality of nozzles provide a first function, the at least one nozzle of the second outlet member provides a second function different than the first function, and the second plurality of nozzles provide a third function different than the first and second functions.

A faucet sprayhead may include a valve which directs water between an aerated outlet and a non-aerated outlet. However, as faucet technology improves and specialized spray patterns may be used to more efficiently use water, there is a need for a valve which can distribute water to multiple functional outlets. According to various embodiments, the sprayhead has three or more possible functions. According to the exemplary embodiment shown, the sprayhead has three possible functions.

FIGS. 1-7 illustrate an exemplary embodiment of a sprayhead 210 configured as a multi-function sprayer. The sprayhead 210 includes a valve 239 for controlling a flow of fluid (e.g., water) through the sprayhead 210 and at least one outlet (e.g., a member outlet) configured to direct the fluid exiting the sprayhead 210. The sprayhead 210 further includes at least one actuator configured to control operation of the valve 239 to switch between the two or more spraying functions. Each actuator may be configured as a toggle, a switch, a button 24, or other suitable configurations. The sprayhead 210 may include one or more features (e.g., studs, pivots, guides, bosses, protrusions, axles, etc.) that are configured to guide and/or facilitate movement of the actuator. Actuation of the actuator causes a change in operation (e.g., volume control, function control, etc.) of the sprayhead 210. The actuator(s) and function of the sprayhead 210 are described in more detail below.

Figure 6:
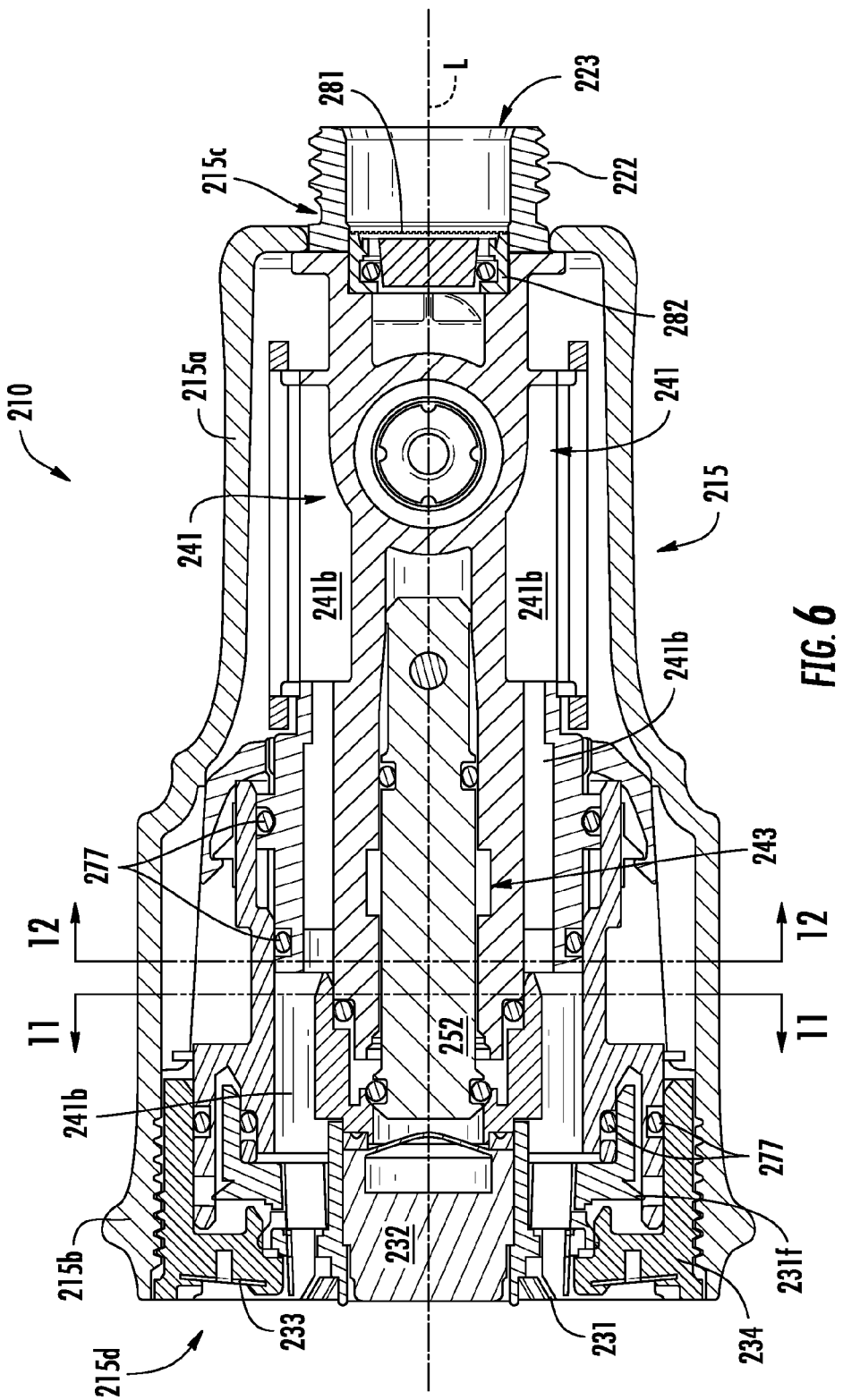
FIG. 6 is a top cross-sectional view of the sprayhead through line 6-6 of FIG. 5.

As shown in FIG. 6, the sprayhead 210 extends along a longitudinal axis L and includes an inlet 223 configured to receive a supply of fluid. The sprayhead 210 may include a connector 222 configured to couple the sprayhead 210 to another member, such as a faucet, a supply hose, etc. The connector 222 may be configured proximate the inlet 223. For example, the connector 222 may define the inlet 223, which is fluidly connected to (e.g., in fluid communication with) the valve 239 of the sprayhead 210 to introduce the fluid into the valve 239. According to an exemplary embodiment, the connector 222 is configured to detachably couple to a hose through threads, where the hose extends through a spout of a faucet such that the sprayhead 10 is fluidly coupled to the faucet. The hose may have a telescopic arrangement (e.g., configuration, connection, etc.) relative to the spout. In other words, the connection allows the sprayhead 210 to be decoupled from the faucet and the hose extracted from the spout, and also allows the hose to be retracted into the spout and the sprayhead 210 to be coupled to the faucet.

Figure 5:
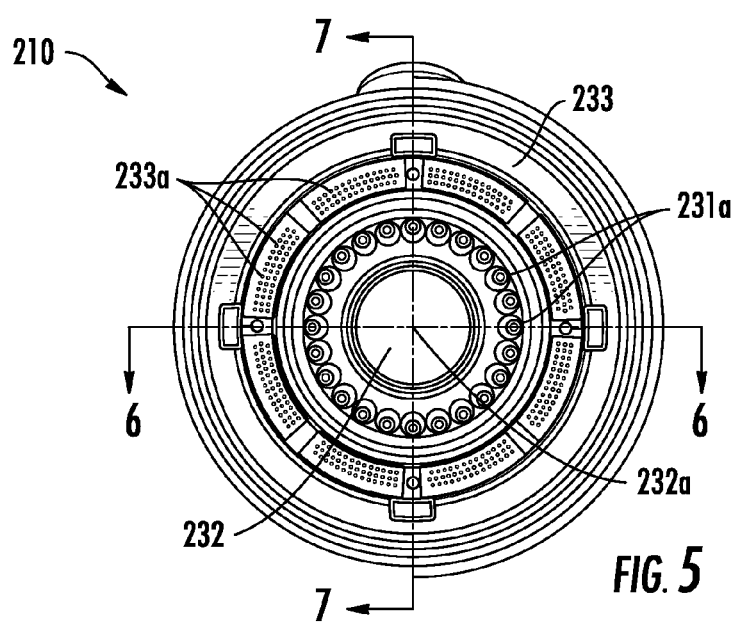
FIG. 5 is a front view of the sprayhead of FIG. 1.

The fluid directed into the inlet 223 flows to the one or more outlets (e.g., outlet members, etc.), which are generally located opposite the inlet 223. As shown in FIGS. 1 and 5, the sprayhead 210 includes a first outlet member 231, a second outlet member 232, and a third outlet member 233.

Figures 29, 30:
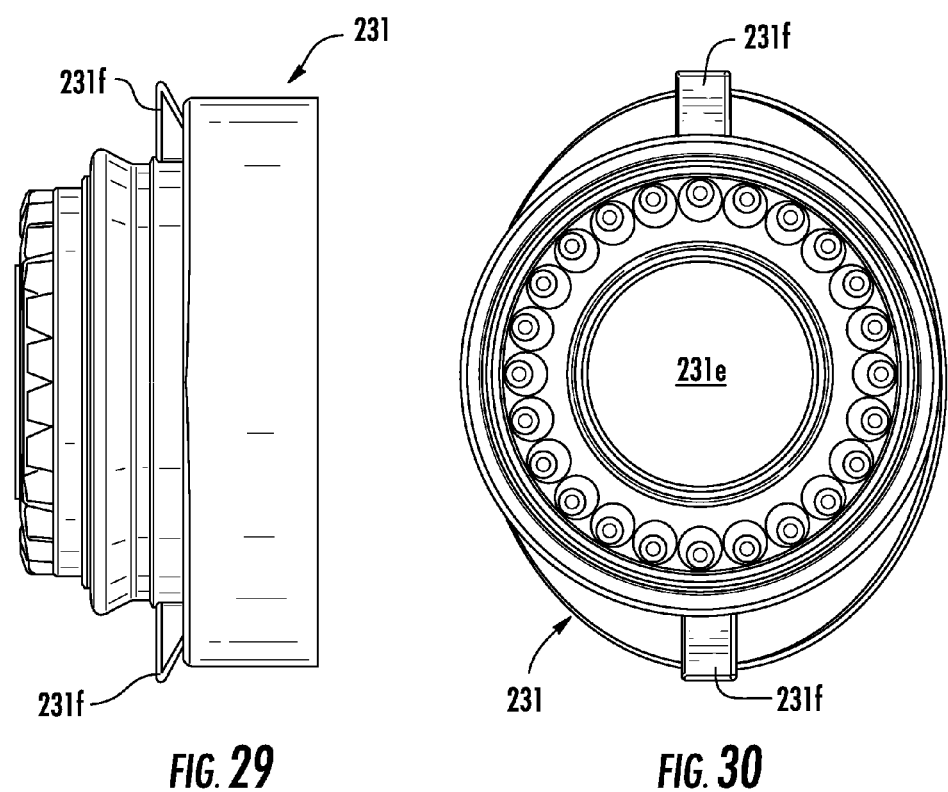
FIG. 29 is a side view of the outlet member of FIG. 27.
FIG. 30 is a front view of the outlet member of FIG. 27.
Figure 31:
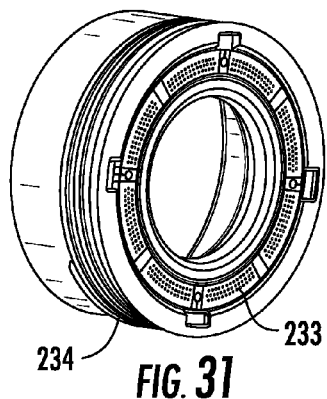
FIG. 31 is a front perspective view of another exemplary embodiment of an outlet member of a sprayhead.

The first outlet member 231 is configured to provide a first spray function. FIGS. 27-30 illustrate an exemplary embodiment of the first outlet member 231 that includes a plurality of nozzles 231a having an annular arrangement and configured to direct the fluid into a first spray pattern. As shown, the first outlet member 231 includes a chamber 231b that is defined by an outer wall 231c and an inner wall 231d. The chamber 231b may be fluidly connected to the valve 239 to receive the fluid therefrom. The inner wall 231d may define a cavity 231e, which may be configured to receive another element of the sprayhead 210 therein, such as the second outlet member 232. As shown in FIGS. 6, 29, and 30, the first outlet member 231 may also include one or more than one coupling features (shown in the form of tabs 231f) that are configured to couple the first outlet member 231 to the valve 239, such as the body 240. The tabs 231f may be resilient in order to elastically deflect during assembly, then engage openings in the body 240 to detachably couple the first outlet member 231 and valve 239 together. According to an exemplary embodiment, the plurality of nozzles 231a of the first outlet member 231 are configured to provide a spray pattern having a defined shape, such as a wedge shape spray pattern. The defined spray pattern may have a focal length (i.e., a distance from the sprayhead 210) at which the defined shape is focused. By way of example, the first outlet member 231 may be configured as shown and described in U.S. patent application Ser. No. 13/359,089, which is incorporated by reference herein in its entirety.

The second outlet member 232 is configured to provide a second spray function that is different than the first spray function of the first outlet member 231. According to an exemplary embodiment, the second outlet member 232 includes at least one nozzle 232a that is configured to provide an aerated stream of fluid from the sprayhead 210.

The third outlet member 233 is configured to provide a third spray function that is different than the first and second spray functions of the first and second outlet members 231 and 232. According to an exemplary embodiment, the third outlet member 233 includes a plurality of nozzles that are configured to provide a fine gentle spray, such as to clean fruit or other fragile objects. For example, the plurality of nozzles of the third outlet member 233 may provide substantially parallel streams or may provide an array of parallel and outward trajectory stream so as to provide a non-intersecting shower of streams of fluid.

It is contemplated that any of the outlets (e.g., outlet members 231, 232, 233) may have any of the features described above, or may have any other function of water. Further, the outlets may include orifices that may or may not include a nozzle coupled to or integrally formed in each orifice. The different outlets may be configured for or used for different purposes, for example, pot filling, hand washing, dish washing, rinsing, power washing, etc., which may be performed better with different spray patterns and/or flow pressures or velocities.

FIGS. 31-35 illustrate an exemplary embodiment of a third outlet assembly that includes a third outlet member 233 having a plurality of nozzles 233a arranged in eight sets (e.g., groups) in an annular manner. As shown, each set includes about 41 nozzles 233a, however, the number of nozzles may be tailored. According to an exemplary embodiment, the third outlet member 233 is formed from a sheet (e.g., a plate, a blank, etc.) of stainless steel having a thickness of about 0.008 inches (e.g., 0.006-0.010 inches), and the plurality of nozzles 233a are etched (e.g., chemically etched, photo etched, etc.) such that each nozzle 233a has a diameter of about 0.012 inches (e.g., 0.010-0.014 inches). According to another exemplary embodiment, each nozzle 233a is tapered, such that the nozzle 233a has an outlet that is a different size (e.g., larger, smaller) than an inlet of the nozzle 233a. For example, the outlet of the nozzle 233a may be about 0.012 inches, and the inlet of the nozzle 233a may be about 0.016 inches (e.g., 0.014-0.018 inches).

Figure 34:
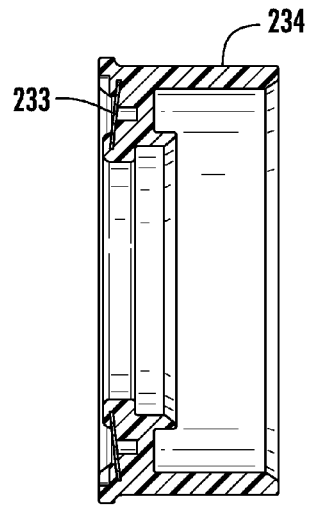
FIG. 34 is a front view of the outlet member of FIG. 31.
Figure 33:
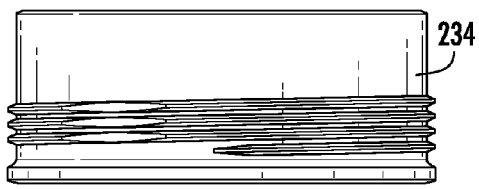
FIG. 33 is a side view of the outlet member of FIG. 31.
Figure 35:
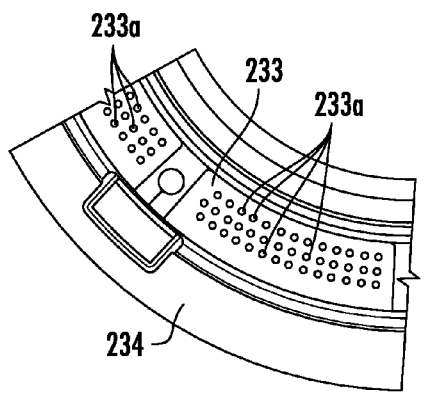
FIG. 35 is a detail view of a plurality of nozzles of the outlet member of FIG. 31.
Figure 32:
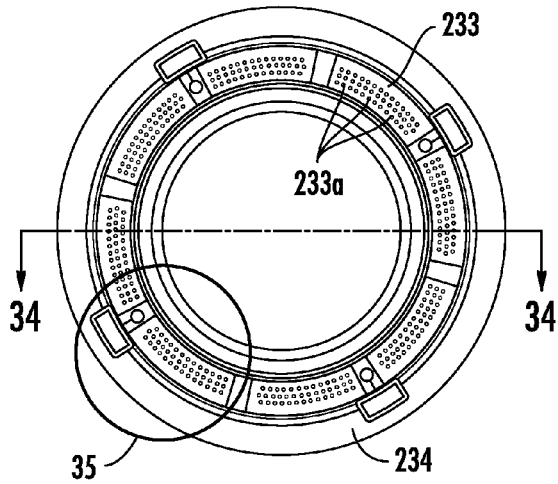
FIG. 32 is a rear view of the outlet member of FIG. 31.

When formed (e.g. etched), the third outlet member 233 is preferably flat. According to an exemplary embodiment, the third outlet assembly also includes an outer member 234 that is formed around the third outlet member 233. The outer member 234 may be made from any suitable material, such as a plastic (e.g., resin, polymer, thermoset, thermoplastic, etc.), and may be made using any suitable method, such as injection molded. For example, the outer member 234 may be over-molded onto the third outlet member 233 to form the third outlet assembly. According to an exemplary embodiment, during the forming of the outer member 234 (e.g., during the over-molding), the flat third outlet member 233 is re-configured to a frusto-conical shape. As shown in FIGS. 6 and 34, an inner diameter of the frusto-conical third outlet member 233 extends forward (i.e., away from the inlet end and toward the spray end the sprayhead) relative to an outer diameter of the third outlet member 233. The frusto-conical arrangement advantageously directs the fluid in a diverging manner, yet forming the nozzles of the third outlet member in the flat allows for a more efficient (e.g., easier, less expensive, etc.) and repeatable manufacturing process. It is noted that the third outlet member may be made from other suitable materials that are corrosion resistant and able to provide the above mentioned functionality.

The outer member 234 of the third outlet assembly may be configured to support the other outlet members. As shown in FIG. 6, the first outlet member 231 is provided in an annular cavity of the outer member 234, and the second outlet member 232 is provided in an annular cavity of the first outlet member 231. In other words, the outlet members may have a nested arrangement in the housing 215 of the sprayhead 210. The outlet members may include features (e.g., locking tabs) that are configured to secure the members to one another and or other elements of the sprayhead 210, such as the housing 215 and/or the body 240.

Figure 44:
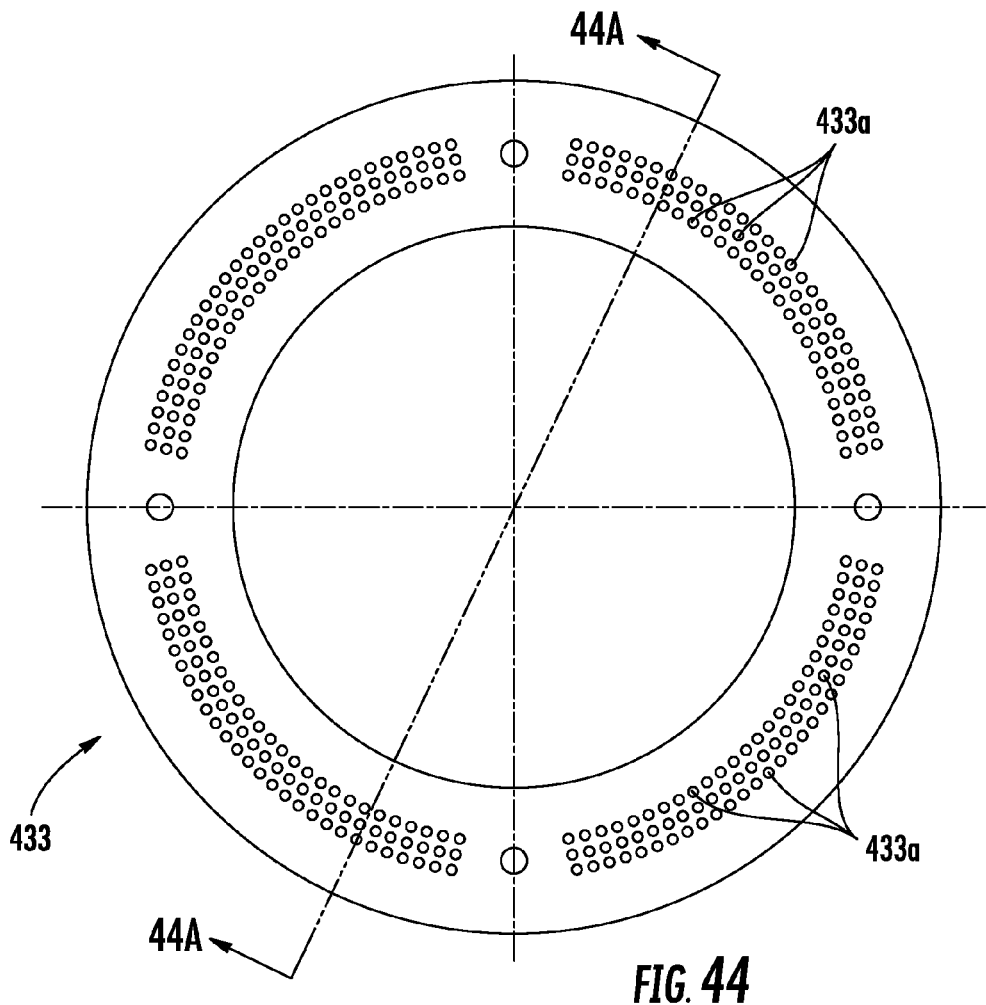
FIG. 44 is a front view of another exemplary embodiment of an outlet member of a sprayhead.
Figure 44A:
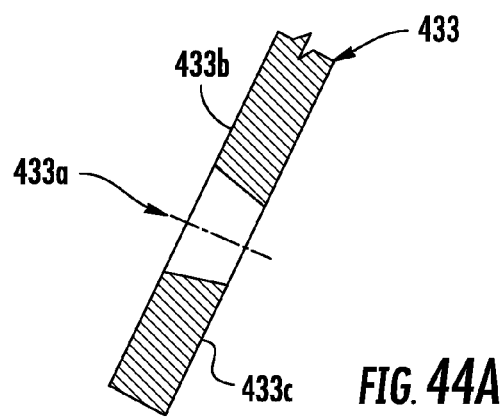
FIG. 44A is a cross-sectional view of the outlet member of FIG. 44 taken along line 44A of FIG. 44.

According to other exemplary embodiments, the third outlet assembly may be configured to include one or more sets of nozzles, where each set includes one or more nozzles. For example, as shown in the embodiment of FIG. 44, the third outlet 433 is configured having four sets of nozzles, where each set includes eighty-one nozzles 433a for a total of three hundred and twenty-four nozzles. As shown, the third outlet member 433 of the third outlet assembly may include four sets of nozzles arranged in four quadrants on the face of the third outlet member, where an outer row of nozzles includes twenty-eight nozzles 433a, the inner row includes twenty-six nozzles 433a, and the intermediate row includes twenty-seven nozzles. The outlet member may be configured differently than what is shown, such as where each set of nozzles includes three rows of twenty-seven nozzles 433a. Each set or quadrant of the third outlet member may include eighty-one nozzles 433a therein. Each nozzle may be configured as an aperture (e.g., hole, opening, etc.) having a generally uniform cross-section (e.g., shape, size, etc.) through the outlet 433. As shown in FIG. 44A, each nozzle 433a is configured having a frusto-conical shape where the size of the entrance (e.g., the cross-sectional area of the nozzle 433a at the inner surface 433c of the outlet 433) is smaller than the size of the exit (e.g., the cross-sectional area of the nozzle 433a at the outer surface 433b of the outlet). According to yet another example, the entrance has a larger size (e.g., cross-sectional area) than the exit of the nozzle 433a.

Figure 7:
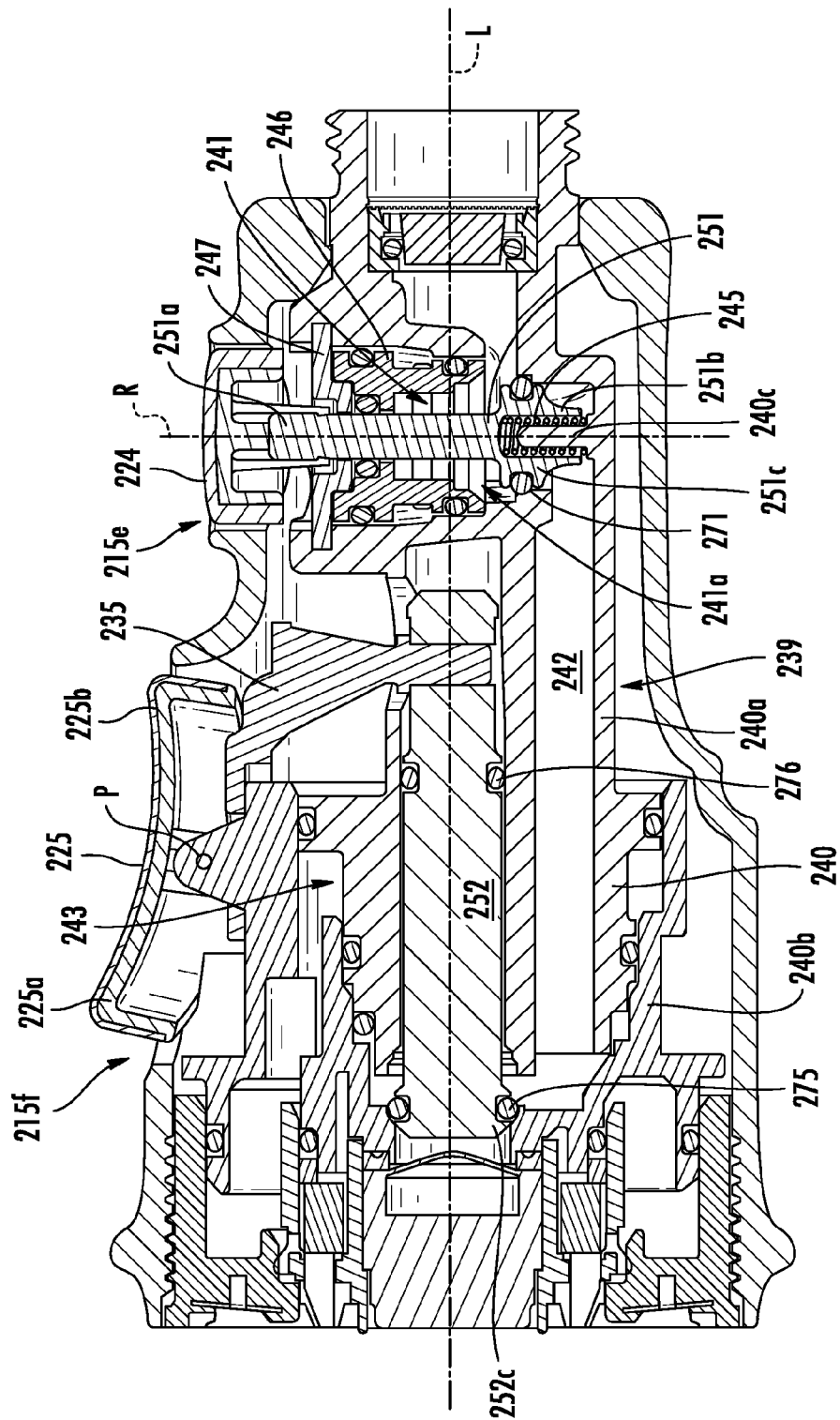
FIG. 7 is a side cross-sectional view of the sprayhead through line 7-7 of FIG. 5.
Figure 8:
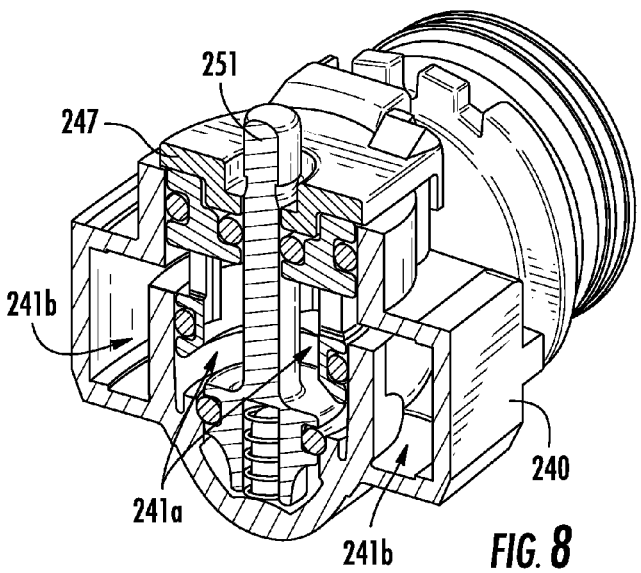
FIG. 8 is a perspective cross-sectional view of a portion of the sprayhead of FIG. 1.

As shown in FIG. 1, the sprayhead 210 includes a first actuator 224 (e.g., button, switch, toggle, etc.) and a second actuator 225. The first and second actuators 224, 225 are configured to control operation of the valve 239 to change (e.g., switch) the operation of the sprayhead 210 between its one or more functions. According to an exemplary embodiment, the first actuator 224 is configured as a button configured to move between a first position (e.g., a non-depressed position) and a second position (e.g., a depressed position). FIG. 7 illustrates the first actuator 224 in the second position. When the first actuator 224 is in the first position, the valve 239 of the sprayhead 210 directs fluid to the second outlet member 232 or the third outlet member 233. When the first actuator 224 is depressed from the first position to the second position, the valve 239 re-directs fluid to the first outlet member 231. As shown, the first actuator 224 is movable in a radial direction R that is transverse to the longitudinal direction L.

As discussed in greater detail below, the sprayhead 210 may include a biasing member that is configured to bias the first actuator 224 (e.g., such as through a diverter). For example, the biasing member may bias the first actuator 224 in a direction from the second position to the first position. This arrangement may advantageously configure the first actuator 224 as a momentary switch, where the button must be retained in the depressed position (e.g., the second position) in order to maintain the alternative spray pattern (e.g., the first spray pattern). Once the pressure depressing the first actuator 224 is released, the biasing force will move the first actuator 224 to the non-depressed position, and the sprayhead 210 will change function (e.g., away from the first spray pattern).

The second actuator 225 may be configured to move between a first position, in which the fluid is directed to either the second outlet member 232 or the third outlet member 233, and a second position, in which the fluid is directed to the other outlet member. According to an exemplary embodiment, the second actuator 225 is configured as a toggle that pivots between a first position (e.g., a forward position) and a second position (e.g., a rearward position). The forward position of the second actuator 225 may correspond to when a front portion 225a of the second actuator 225 is depressed toward the sprayer (e.g., toward the longitudinal axis L) and when a rear portion 225b of the second actuator 225 is extended away from the sprayer or the longitudinal axis L (see FIG. 7). The rearward position of the second actuator 225 may correspond to when the rear portion 225b is depressed toward the sprayer or the longitudinal axis L and the front portion 225a is extended away from the sprayer or the longitudinal axis L. FIG. 7 illustrates the second actuator 225 in the rearward position. The second actuator 225 may be pivotally coupled to the valve 239 and/or to another element of the sprayhead, such as a housing. As shown, the second actuator 225 is pivotally coupled to a pivot P of the body 240.

According to an exemplary embodiment, when the second actuator 225 is in the first position, the fluid is directed to the second outlet member 232, and when the second actuator 225 is in the second position, the fluid is directed to the third outlet member 233. Thus, a user of the sprayhead 210 may switch between the second and third spray functions by moving (e.g., toggling) the second actuator 225 between its first and second positions.

The sprayhead 210 may optionally include a housing 215 (e.g., a casing, etc.) that is configured to house one or more elements of the sprayhead 210. As shown in FIG. 6, the housing 215 includes an outer wall having a first portion 215a and a second portion 215b, which house and surround at least a portion of the valve 239. In other words, the outer wall of the housing 215 defines a cavity (e.g., chamber, etc.) for receiving at least a portion of the valve 239 therein. The outer wall may include an opening therein. As shown, the outer wall of the housing 215 includes a first opening 215c disposed at a first end (e.g., an inlet end) of the housing 215 adjacent to the first portion 215a and also includes a second opening 215d disposed at a second end (e.g., an outlet end) of the housing 215 adjacent to the second portion 215b. A portion of the sprayhead 210, such as the connector 222 and/or the valve 239, is configured to extend through the first opening 215c. The one or more outlet members may be disposed in the second opening 215d. As shown, the first outlet member 231, the second outlet member 232, and the third outlet member 233 are disposed in the second opening 215d of the housing 215, such that the fluid directed from the outlet members are discharged from the second end of the housing 215 having the second opening 215d.

The housing 215 may include one or more than one feature configured to couple and/or secure another element of the sprayhead 210 to the housing. For example, the housing 215 may include a feature, such as threads, that the third outlet assembly detachably (e.g., removably, selectively, etc.) couples thereto. As shown in the exemplary embodiment of FIG. 6, the outer member 234 of the third outlet assembly includes external threads that mesh with internal threads of the outer wall (e.g., second portion 215b) of the housing 215 to detachably couple the third outlet assembly to the housing 215. This arrangement advantageously allows the third outlet assembly (e.g., along with the third outlet member 233) to be removed, such as for cleaning purposes. This is particularly advantageous for the embodiment of the third outlet member 233 having 0.012 inches diameter nozzles 233a, since the nozzles may become plugged with debris due to their relative small size, which provides the gentle spray. Also, for example, the housing 215 may include a feature that facilitates coupling of the valve 239 to the housing 215.

Figure 2:
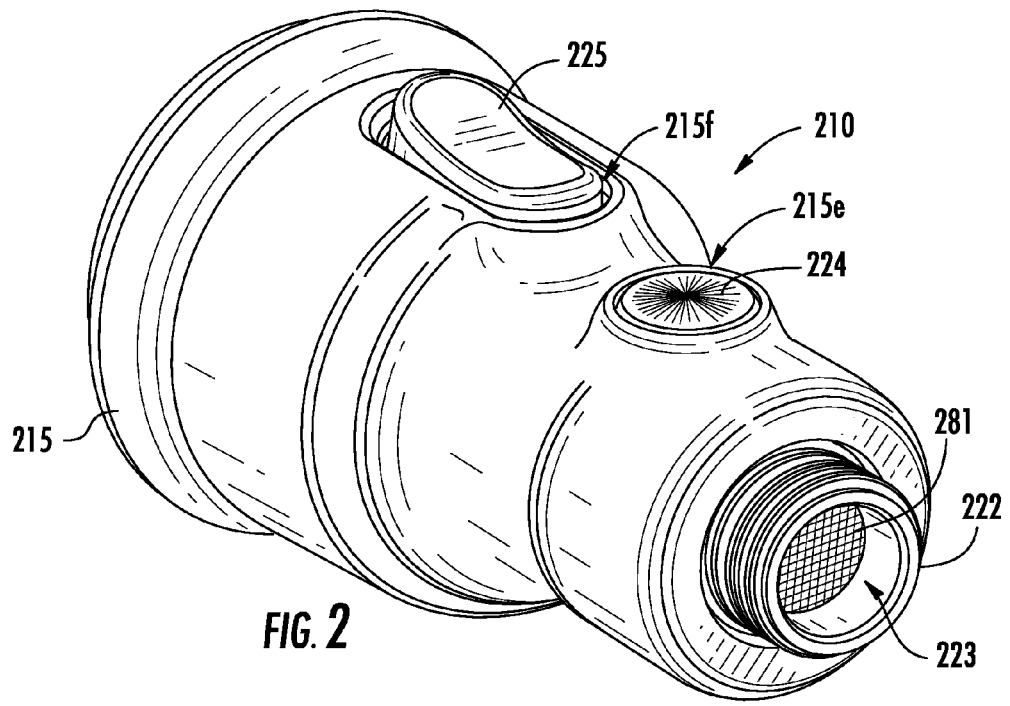
FIG. 2 is a rear perspective view of the sprayhead of FIG. 1.
Figure 3A:
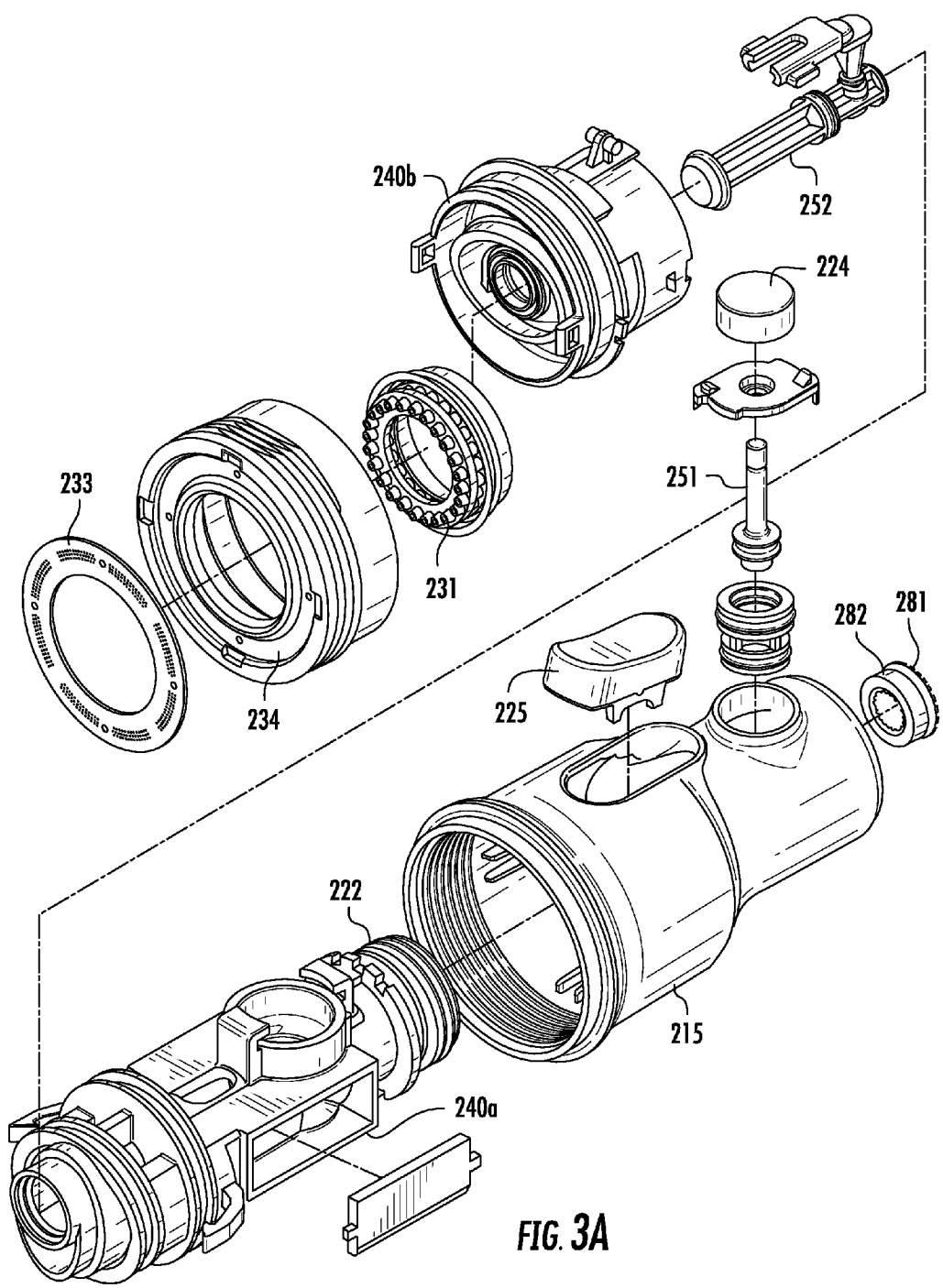
FIG. 3A is an exploded perspective view of the sprayhead of FIG. 1.
Figure 3B:
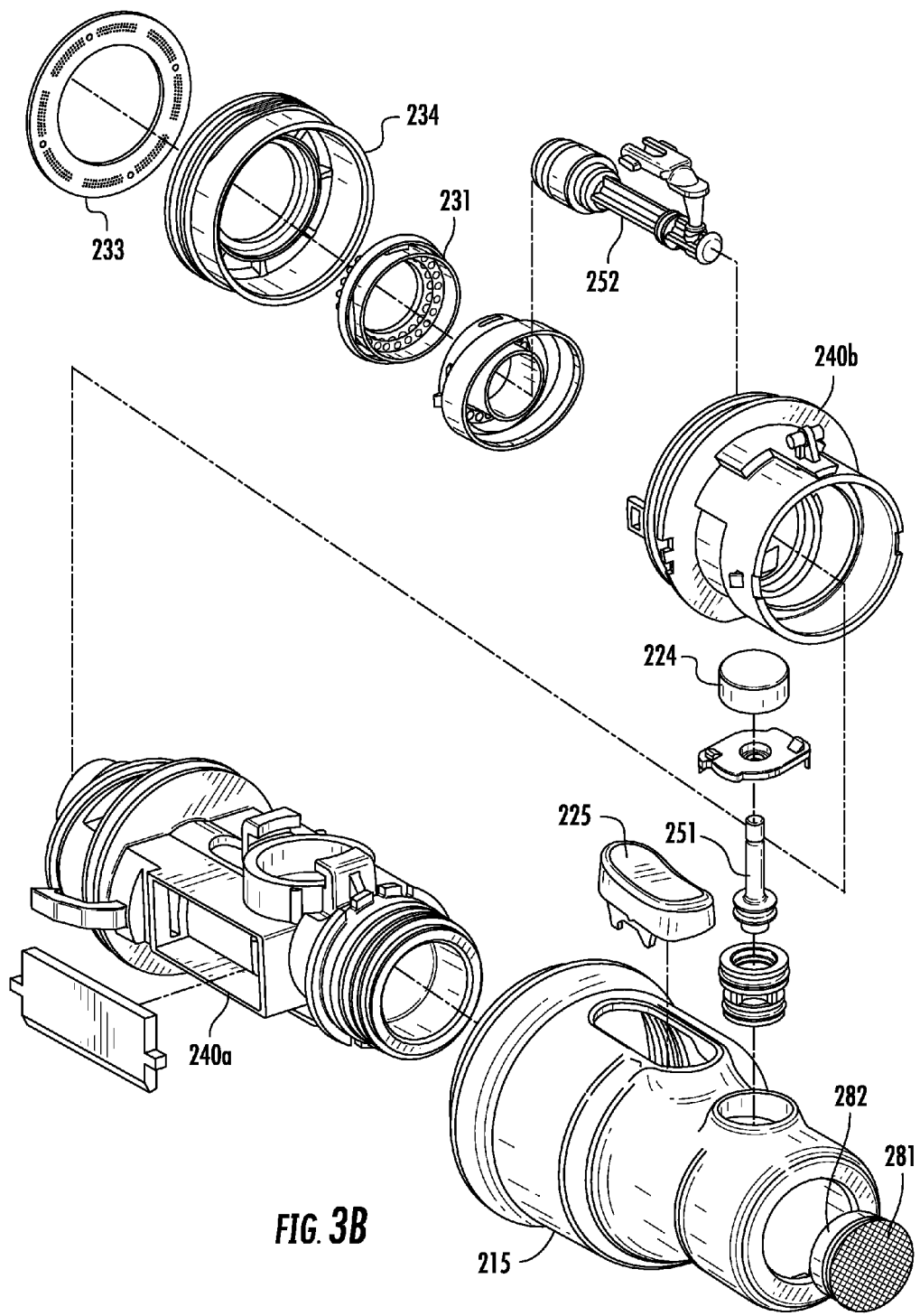
FIG. 3B is another exploded perspective view of the sprayhead of FIG. 1.
Figure 4:
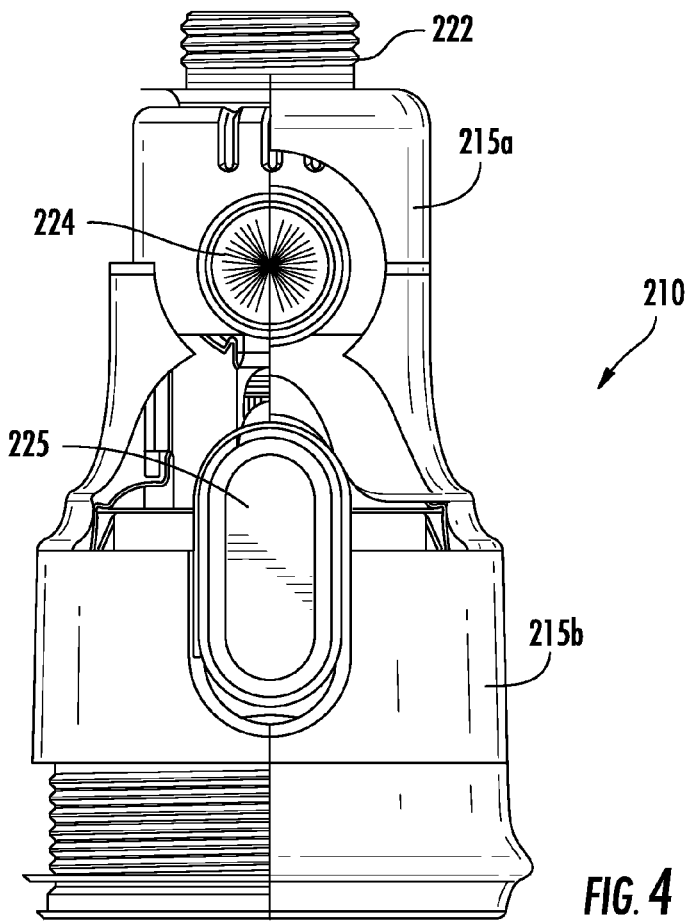
FIG. 4 is a top view of the sprayhead of FIG. 1, with select portions of the housing removed for clarity.

The housing 215 may further include one or more additional openings, such as, for example, to receive the one or more actuators for controlling operation of the sprayhead 210. As shown in FIGS. 1-3, the housing 215 includes a third opening 215e that is configured to receive the first actuator 224 and a fourth opening 215f that is configured to receive the second actuator 225. The third opening 215e may have a generally circular cross-sectional shape to define a cylindrical bore in the housing 215 to receive the first actuator 224, or may have any suitable shape that is tailored to the shape of the first actuator 224. The fourth opening 215f may have a generally elongated (e.g., elliptical, slotted, etc.) cross-sectional shape to define a bore in the housing 215 that has a corresponding shape as the second actuator 225, or may have any suitable shape that is tailored to the shape of the second actuator 225.

Figure 18:
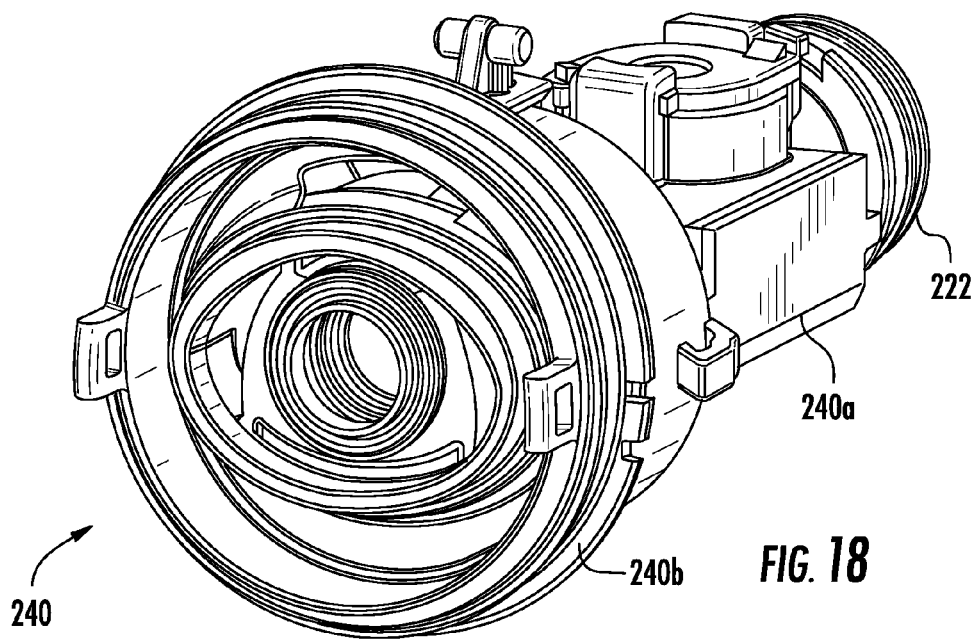
FIG. 18 is a perspective view of an exemplary embodiment of a body of a sprayhead.
Figure 19:
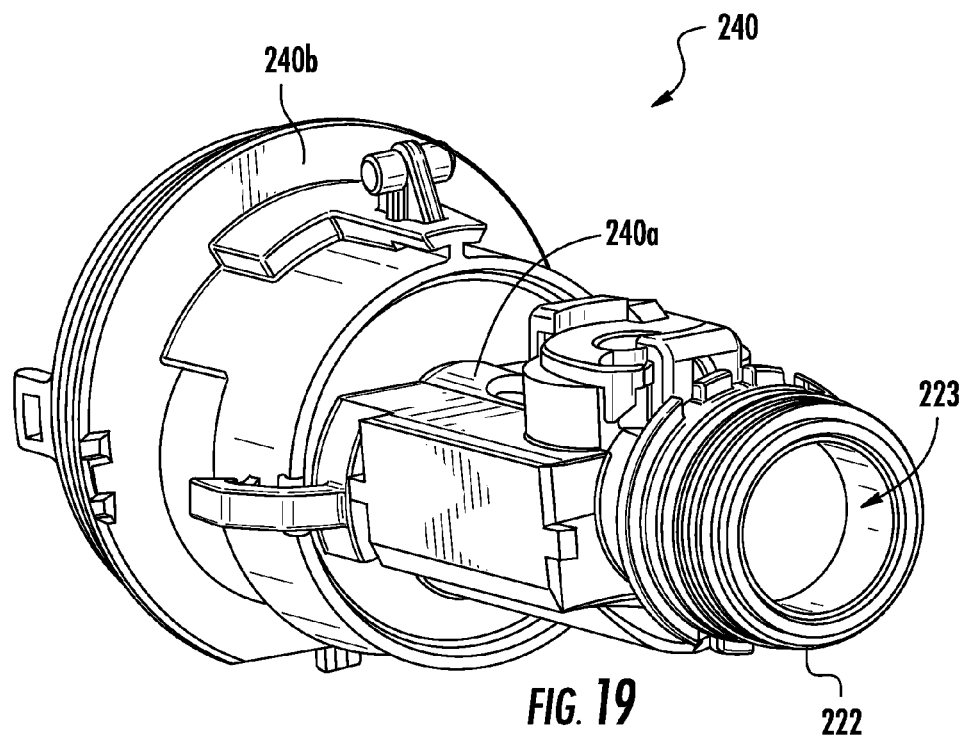
FIG. 19 is another perspective view of the body of FIG. 18.

As shown in FIGS. 3, 6, and 7, the valve 239 (e.g., fluid control valve) includes a body 240 (e.g., a valve body). FIGS. 18 and 19 illustrate an exemplary embodiment of the body 240. The body 240 includes an inlet that is configured to receive a supply of fluid. According to one example, the inlet of the body 240 is the inlet 223 of the sprayhead 210. For this example, the connector 222 may optionally be integrally formed with the body 240. According to another example, the inlet of the body 240 is separately formed from the inlet 223 (and/or the connector 222) of the sprayhead 210. For this example, the inlet of the body 240 may be in fluid communication with (e.g., fluidly connected to) with the inlet 223.

The valve 239 may also include one or more than one chamber that is configured to receive the fluid. As shown in FIGS. 6 and 7, the body 240 of the valve 239 includes a first chamber 241, a second chamber 242, and a third chamber 243, where each chamber is configured to selectively receive the fluid depending on the mode of operation of the sprayhead 210 (e.g., the arrangement of the valve 239). The one or more chambers may be defined by the body 240, either alone or in combination with other elements of the sprayhead 210.

The body 240 may include one or more portions. As shown in FIGS. 18 and 19, the body 240 includes a first portion 240a and a second portion 240b, which may be integrally formed together or formed separately then coupled together. As shown, the first portion 240a is the inlet end of the body 240 and the second portion 240b is the outlet end of the body 240.

Figure 20:
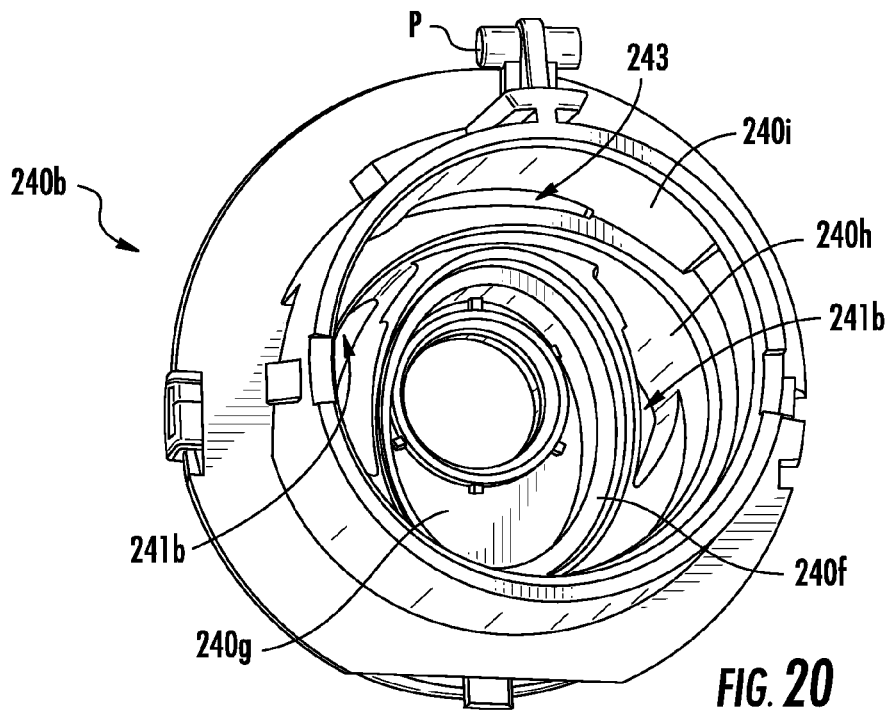
FIG. 20 is a front perspective view of a portion of the body of FIG. 18.
Figure 21:
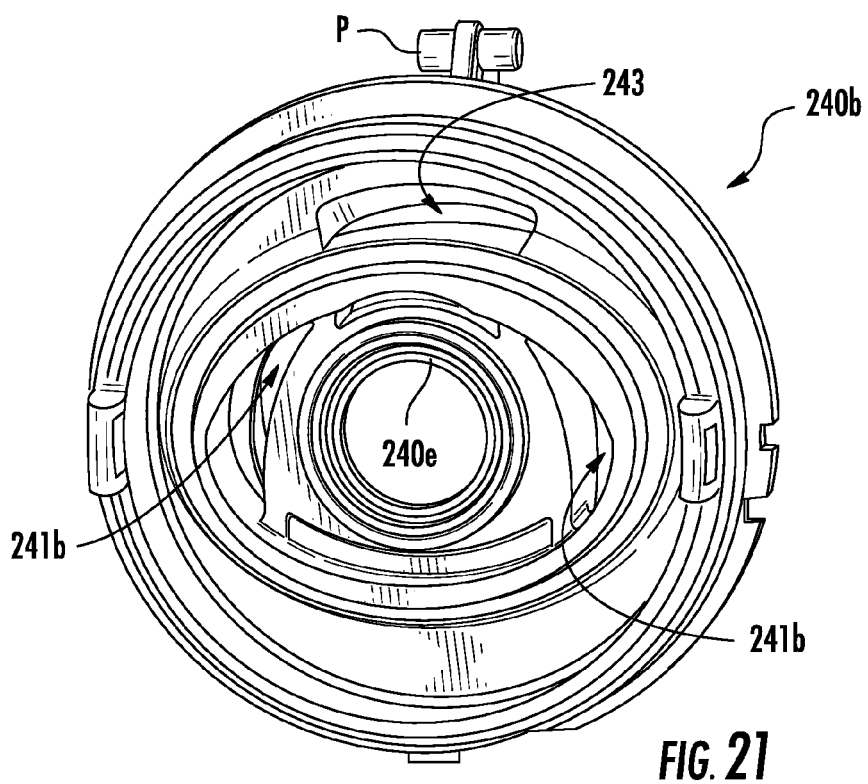
FIG. 21 is a rear perspective view of the portion of FIG. 20.
Figure 22:
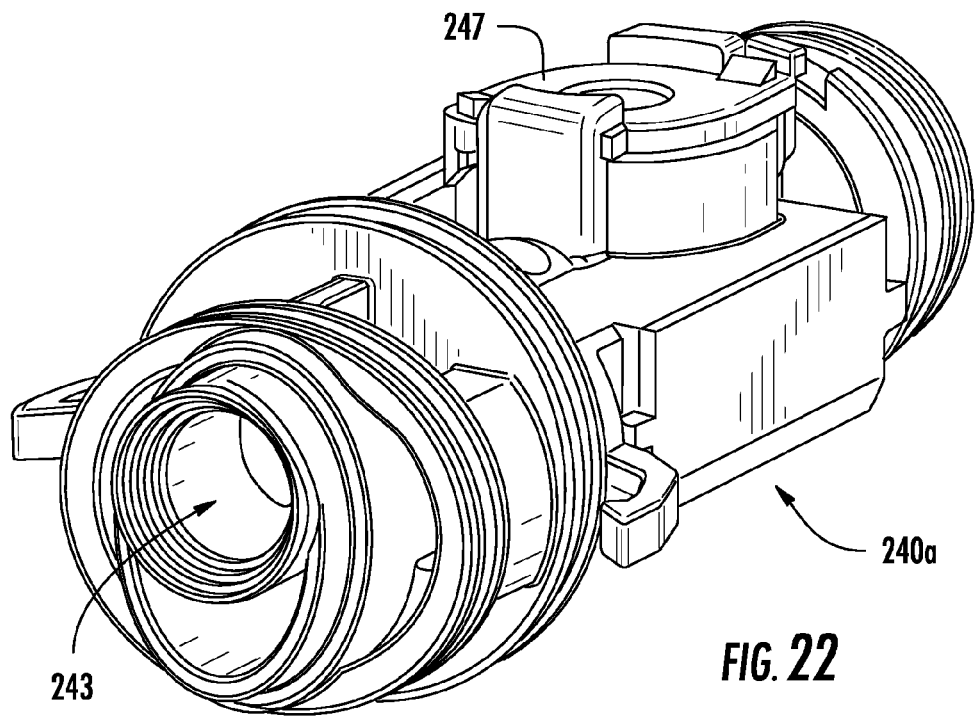
FIG. 22 is a perspective view of a portion of a body of a sprayhead.

FIGS. 20 and 21 illustrate an exemplary embodiment of a second portion 240b of the body 240. The second portion 240b may be configured to include one or more circular, elliptical, and/or other suitably shaped members (e.g., sections, walls, etc.) to help define the one or more chambers of the valve 239. As shown, the second portion 240b includes a circular shaped inlet 240e, a first elliptical section 240f that is provided around the inlet 240e and extends from a base 240g away from the inlet 240e, a second elliptical section 240h provided around and extending from the first elliptical section 240f away from the inlet 240e, and a first circular section 240i provided around and extending from the second elliptical section 240h away from the inlet 240e. The first elliptical section 240f may have a major axis that extends in the radial direction R and a minor axis that extends in a second direction that is transverse to the radial direction. The first elliptical section 240f may help define the second chamber 242, such as together with the base 240e and the first portion 240a. The second elliptical section 240h may have a major axis that extends in the second (transverse) direction of the minor axis of the first elliptical section 240f and a minor axis that extends in the radial direction R. The second elliptical section 240h may help define the second portion 241b of the first chamber 241, either alone or in combination with the first elliptical section 240f. The first circular section 240i may have a major axis that extends in the radial direction R and a minor axis that extends in a second (transverse) direction. The first circular section 240i may help define the third chamber 243, either alone or in combination with the second elliptical section 240h. According to the example shown, the second portion 240b includes the pivot P, about which the second actuator 225 is configured to pivot.

FIGS. 22-26 illustrate an exemplary embodiment of the first portion 240a of the body 240. The first portion 240a may be configured to include one or more circular, elliptical, and/or other suitably shaped members (e.g., sections, walls, etc.) to help define the one or more chambers of the valve 239. For example, the first portion 240a may include members that help define the inlet 223, the connector 222, the first chamber 241 (e.g., the first portion 241a, the second portion 241b), the second chamber 242, and/or the third chamber 243. As shown, the first portion 240a includes a second circular section 240j that helps define the third chamber 243, a first elliptical section 240k that helps define the second chamber 242, and a second elliptical section 240m that helps define the second portion 241b of the first chamber 241. For example, second chamber 242 may be defined by the first elliptical section 240k in combination with the second circular section 240j. Also, for example, each second portion 241b may be defined by the second elliptical section 240m in combination with the first elliptical section 240k and/or the second circular section 240j.

Figure 23:
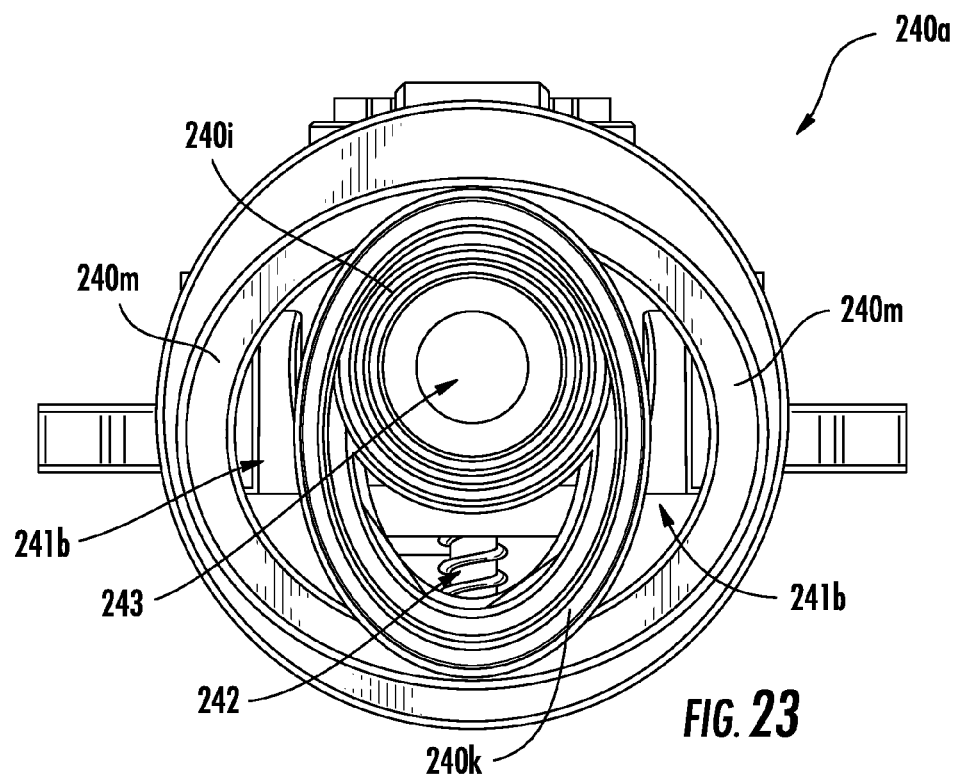
FIG. 23 is a front view of the portion of the body of the sprayhead of FIG. 22.
Figure 24:
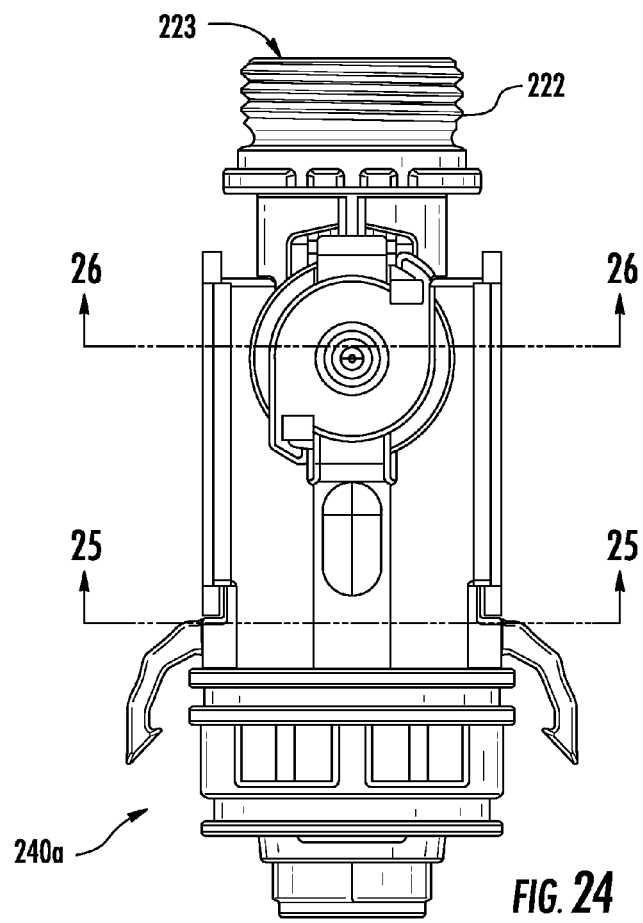
FIG. 24 is a top view of the portion of the body of the sprayhead of FIG. 22.
Figures 25, 26:
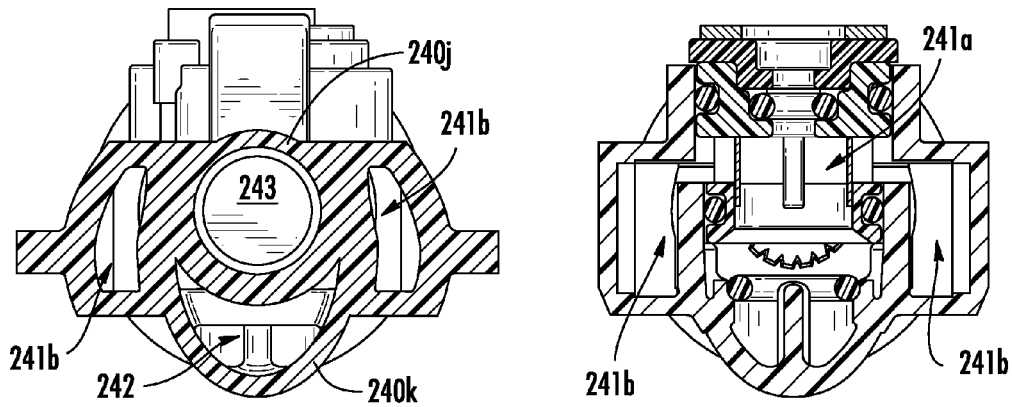
FIG. 25 is a front cross-sectional view of the sprayhead through line 25-25 of FIG. 24.
FIG. 26 is another front cross-sectional view of the sprayhead through line 26-26 of FIG. 24.
Figures 27, 28:
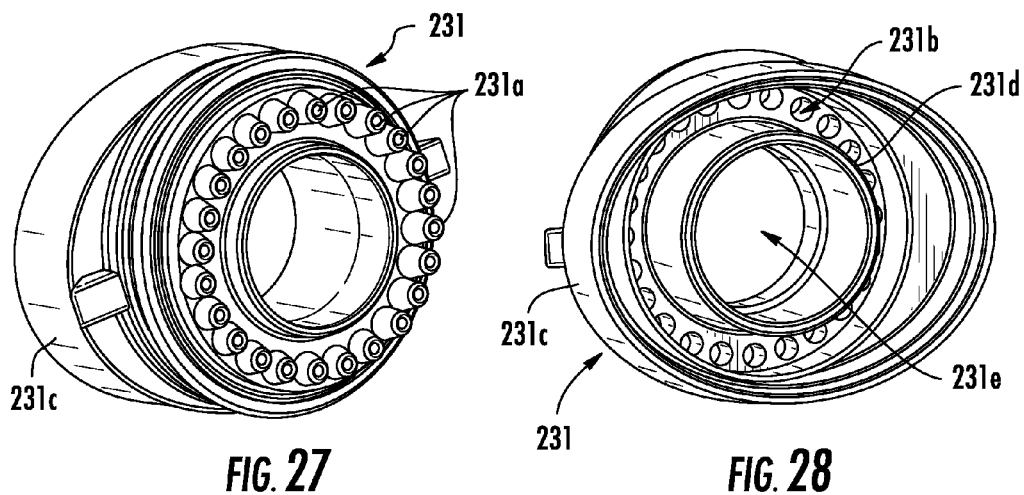
FIG. 27 is a front perspective view of an exemplary embodiment of an outlet member of a sprayhead.
FIG. 28 is a rear perspective view of the outlet member of FIG. 27.

The first elliptical section 240k may have a major axis that extends in the radial direction R and a minor axis that extends in a second transverse direction. The second circular section 240j may be contained within, for example, the first elliptical section 240k, such that a portion or all of the second circular section 240j is provided within the first elliptical section 240k, as shown in FIGS. 23 and 25. Alternatively, the first elliptical section 240k and the second circular section 240j may overlap with one another. The second elliptical section 240m may have a major axis that extends in the second transverse direction and a minor axis that extends in the radial direction R. The plurality of elliptical sections of the body 240 may advantageously allow for the body 240 to include multiple chambers, which supply fluid to multiple outlets, in a relative small size (e.g., cross-section). Thus, the sprayhead 210 can provide multiple spray functions and still have a relatively compact size.

The valve 239 may also include one or more than one diverter (e.g., divert piston, piston, valve stem, etc.). As shown in FIGS. 6 and 7, the valve 239 includes a first diverter 251 and a second diverter 252, where the first and second diverters 251, 252 are movable within the body 240 to control the fluid flow between the first, second, and third chambers 241, 242, 243.

According to an exemplary embodiment, the first diverter 251 is movable between a first position (e.g., upward position, non-depressed position) and a second position (e.g., downward position, depressed position). FIG. 7 illustrates the first diverter 251 in the second position. When the first diverter 251 is in the second position, the first chamber 241 is fluidly connected to the inlet 223 and the second chamber 242 is fluidly disconnected from the inlet 223, such that the fluid flow is directed from the inlet 223 to the first chamber 241. Accordingly, no fluid is directed into the second chamber 242 when the first diverter 251 is in the second position. When the first diverter 251 is in the first position, the second chamber 242 is fluidly connected to the inlet 223 and the first chamber 241 is fluidly disconnected from the inlet 223, such that the fluid flow is directed form the inlet 223 to the second chamber 242. Accordingly, no fluid is directed into the first chamber 241 when the first diverter 251 is in the first position.

As shown in FIG. 7, the first actuator 224 is configured to move (e.g., slide, translate, etc.) the first diverter 251 along direction R between its first and second positions when actuated (e.g., depressed) by a user of the sprayhead 210. Thus, a portion of the first diverter 251 may be coupled directly (or indirectly through another element of the sprayhead 210) to the first actuator 224, such that movement of the first actuator 224 results in a corresponding movement of the first diverter 251. For example, a first end 251a of the first diverter 251 may be coupled to the first actuator 224. The first actuator 224 may move relative to, for example, the housing 215.

FIGS. 40-43 illustrate an exemplary embodiment of the first diverter 251. The first diverter 251 includes the first end 251a, a second end 251b, and a sealing portion 251c, which may be provided between the first and second ends 251a, 251b. As shown in FIG. 7, the sealing portion 251c is configured to provide a seal between the first diverter 251 and a portion of the valve 239 (e.g., a portion of the body 240) to prevent the fluid from passing beyond the seal. For example, the sealing portion 251c may seal-off (e.g., fluidly disconnect) the second chamber 242 to prevent fluid from passing from the inlet 223 to the second chamber 242 when the first diverter 251 is configured in the second position. Also, for example, the sealing portion 251c may seal-off the first chamber 241 to prevent fluid from passing from the inlet 223 to the first chamber 241 when the first diverter 251 is configured in the first position.

Figure 42:
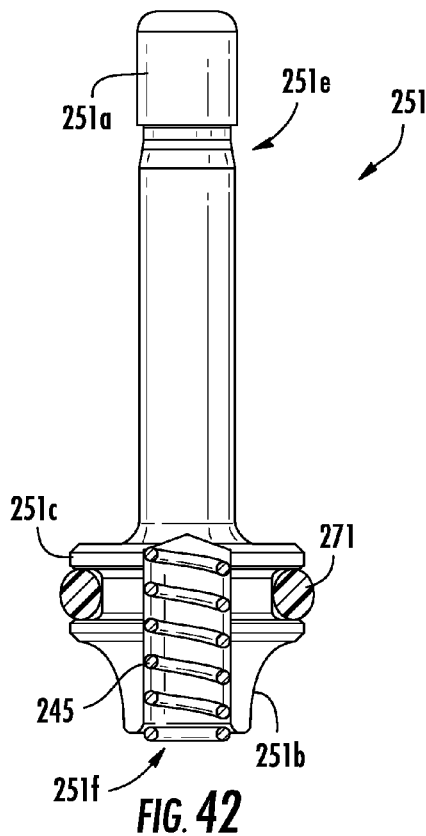
FIG. 42 is a side cross-sectional view of the diverter assembly of FIG. 40.
Figure 43:
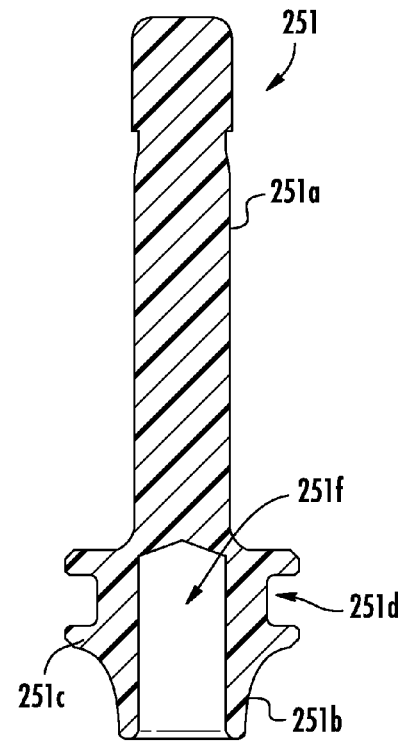
FIG. 43 is a side cross-sectional view of an exemplary embodiment of a diverter of the diverter assembly of FIG. 40.

As shown in FIGS. 40-43, the first diverter 251 is configured generally as a piston (e.g., has a piston shape). The first end 251a may have a generally cylindrical shape, which may include a feature, such as an undercut section 251e (e.g., recess, channel, etc.) that is configured to receive a portion of the first actuator 224 to couple the first diverter 251 and first actuator 224 together. The first actuator 224 may include a flexible detent member that expands when moving over the non-undercut portion of the first end 251a, then snaps into a mechanical locking arrangement with the undercut when the detent member engages the undercut. The second end 251b may have a generally cylindrical shape, conical shape, or any suitable shape. The sealing portion 251c may have a generally cylindrical shape that is disposed closer to the second end 251b. However, it is noted that the shape of the first diverter 251, as well as the location of the sealing portion 251c, can be tailored to the geometry of the valve 239 (e.g., the body 240). The sealing portion 251c may include a raised (e.g., an outwardly extending) portion relative to the second end 251b (and/or the first end 251a). As shown in FIGS. 42 and 43, the sealing portion 251c is configured as a shoulder extending away from the second end 251b. The sealing portion 251c may optionally include a channel 251d (e.g., recessed portion) configured to receive a sealing member (e.g., a seal, an o-ring, etc.). As shown, the channel 251d is recessed into the shoulder of the sealing portion 251c, such that the sealing portion 251c has a generally C-shaped cross-section to receive the sealing member 271 in the form of an o-ring in the channel 251d. For the embodiment including the sealing member 271, the sealing member 271 may alone, or in cooperation with the sealing portion 251c, fluidly disconnect the first chamber 241 or the second chamber 242 from the inlet 223 depending on the position of the first diverter. In other words, when the first diverter 251 is in the second position, the second chamber 242 may be fluidly disconnected from the inlet 223 by the sealing member 271 and first diverter 251; and when the first diverter 251 is in the first position, the first chamber 241 may be fluidly disconnected from the inlet 223 by the sealing member 271 and the first diverter 251.

The valve 239 may optionally include a biasing member that is configured to bias the first diverter 251 in a direction. As shown in FIGS. 7 and 42, the biasing member 245 is in the form of a coil spring (e.g., a helical spring, a compression spring, an extension spring, etc.) configured to bias the first diverter 251 from the second position (e.g., the user depressed position) toward the first position (e.g., the pre-user depressed position). In this arrangement, a force from the biasing member may advantageously be in an opposing (e.g., counteracting) direction than the force of the user depressing the first actuator 224. When the user depresses the first actuator 224, such as to the second position, the biasing member 245 is compressed thereby storing energy. Once the user releases the force depressing the first actuator 224, the biasing member 245 exerts a force from the stored energy to return the first actuator 224 to the first position.

The biasing member 245 may have a first portion (e.g., a first end) that engages the first diverter 251 and a second portion (e.g., a second end) that engages a portion of another element of the valve 239 to impart a biasing force between the first diverter 251 and the other element. As shown, the second end 251b of the first diverter 251 includes a bore 251f that receives a post 240c of the body 240 with the biasing member 245 disposed in the bore 251f between the post 240c and the second end 251b of the first diverter 251. The bore 251f may have a generally cylindrical shape, according to one example, to receive and retain the biasing member 245 in the form of a coil spring. The post 240c may be disposed on the first portion 240a of the body 240, and may have a generally cylindrical shape, according to one example. The post 240c may also help guide movement of the first diverter 251, such as by maintaining the position (e.g., the radial position, etc.) of the first diverter 251 relative to the body 240 as the first diverter 251 moves between the first and second positions in the radial direction. This arrangement may advantageously help the first diverter 251 provide a good and repeatable seal with the body 240.

Also shown in FIG. 7, the first chamber 241 includes a first portion 241a that receives at least a portion of the first diverter 251 therein. The first portion 241a may be configured to extend in the radial direction R (which may be transverse to the longitudinal direction L), such that the first diverter 251 moves in the radial direction R within the first portion 241a between the first and second positions. The first chamber 241 may further include a second portion 241b that is fluidly connected to an outlet (e.g., an outlet member). As shown in FIG. 6, the second portion 241b is fluidly connected to the first outlet member 231, such that fluid passing through the first chamber 241 exits the sprayhead 210 through the plurality of nozzles 231a of the first outlet member 231. Also shown, the sprayhead 210 may include two parallel second portions 241b, where each second portion 241b extends along one of the two opposing sides of the body 240. Each second portion 241b may be configured to extend at an angle relative to the first portion 241a. For example, each second portion 241b may extend in a transverse direction (e.g., the longitudinal direction) relative to the radially extending first portion 241a.

The valve 239 may optionally include additional elements (e.g., components, members, etc.) to help retain the first diverter 251 and/or seal the first chamber 241. As shown in FIGS. 7-10, the valve 239 include a support sleeve 246 and a retaining member 247.

Figure 9:
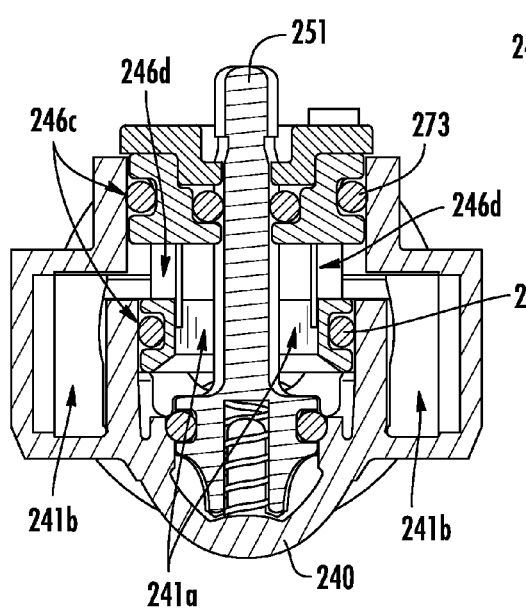
FIG. 9 is a front view of the cross-section of the portion of the sprayhead of FIG. 8.

The support sleeve 246 may be disposed in the first portion 241a of the first chamber 241 to support the first diverter 251, such as during movement thereof. The support sleeve 246 may include an outer wall 246a that is shaped to complement the shape of the body 240 (e.g., walls thereof defining the first portion 241a) to maintain the relative position between the support sleeve 246 and the body 240. The outer wall 246a may include one or more than one channel that is configured to receive a corresponding number of sealing members therein. As shown in FIG. 9, the outer wall 246a includes two offset generally C-shaped (e.g., cross-sectional) channels 246c configured to receive the sealing members 272, 273 therein to provide seals between the support sleeve 246 and the body 240. The outer wall 246a includes one or more openings 246d, such as one or two pair of opposing openings, that allow fluid to flow from the first portion 241a to the second portion 241b of the first chamber 241. The support sleeve 246 also includes an inner wall 246b that extends inwardly from the outer wall 246a and is configured to help maintain the position (e.g., concentricity) of the first diverter 251 (e.g., an end thereof) relative to the body 240. The inner wall 264b may include an opening defining an inner surface, which may contact an outer surface of the first diverter 251 to maintain the relative position of the diverter, and act as a guide to the diverter during its movement.

Figure 10:
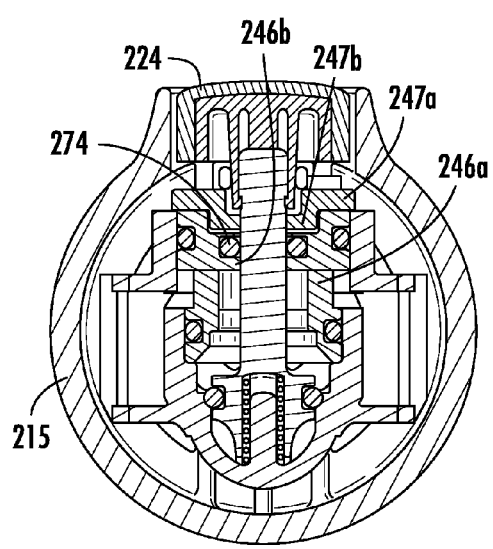
FIG. 10 is another front cross-sectional view of the sprayhead of FIG. 1.

The retaining member 247 may be configure to retain other elements (e.g., the support member 246) in place in the valve 239. As shown in FIGS. 7 and 10, the retaining member 247 includes an upper wall 247a and a lower wall 247b. The upper wall 247a may be configured to engage the body 240, such as a channel (as shown in FIG. 7) of the first portion 240a, to secure the retaining member 247 in place relative to the body 240. The upper wall 247a and/or the lower wall 247b may be configured to retain the support member 246 in place, such as by contacting a portion of the support member 246 to prohibit the support member 246 from moving out of the first chamber 241. The lower wall 247b may extend away from the upper wall 247a toward the support member 246, and include an opening therein that a portion of the first diverter 251 may pass through. Thus, the lower wall 247b includes an inner surface that is configured to support the first diverter 251, such as through an abutting arrangement. A cavity may be formed between the inner wall 246b of the support member 246, the lower wall 247b of the retaining member 247, and the first diverter 251, where the cavity receives the sealing member 274 therein to form a seal between these elements of the sprayhead 210.

According to an exemplary embodiment, the second diverter 252 is movable between a first position and a second position. FIG. 7 illustrates the second diverter 252 in the second position (e.g., forward position, left-side position). In the first position, the second diverter 252 is in a rearward or right-side position (i.e., where it is moved from left to right in FIG. 7). When the second diverter 252 is in the second position, the third chamber 243 is fluidly connected to (e.g., in fluid communication with) the second chamber 242, such that fluid flow is directed from the second chamber 242 to the third chamber 243. When the second diverter 252 is in the first position, the third chamber 243 is fluidly disconnected from the second chamber 242, such that no fluid is directed into the third chamber 243 from the second chamber 242. For example, the second outlet member 232 (or a chamber leading thereto) may be fluidly connected to the second chamber 242, when the second diverter 252 is in its first position.

As shown in FIGS. 6 and 7, when the second diverter 252 is in the second position, the fluid flows from the second chamber 242 through the third chamber 243 to third outlet member 233 to provide the third spray function (e.g., mode of operation) of the sprayhead 210. Thus, the plurality of nozzles 233a of the third outlet member 233 are fluidly connected to the third chamber 243 in this configuration. When the second diverter 252 is in the first position, the fluid flows from the second chamber 242 to the second outlet member 232 to provide a second spray function of the sprayhead 210. Thus, the at least one nozzle 232a of the second outlet member 232 is fluidly connected to the second chamber 242 in this configuration. The second chamber 242 may include more than one portion. For example, the second chamber 242 may include a first portion that is fluidly connected to the inlet 223, such as when the first diverter 251 is in the second position, and may also include a second portion that is fluidly connected to the first portion of the second chamber 242, such as when the second diverter 252 is in the first position. The second portion of the second chamber 242, if provided, may be fluidly connected to the second outlet member 232. According to an exemplary embodiment, the second outlet member 232 may be aligned with the second diverter 252, and therefore aligned with the third chamber 243. For this example, the second portion of the second chamber 242 may be provided between the second outlet member 232 and the second diverter 252. The second portion of the second chamber 242, as described above, may alternatively be configured as a lead-in chamber to the second outlet member 232, which fluidly connects the second chamber 242 and the second outlet member 232, such as when the second diverter 252 is in its first position.

As shown in FIGS. 6 and 7, the second diverter 252 is configured to move within the body 240 in the longitudinal direction L between the first and second positions. For example, at least a portion of the second diverter 252 may be disposed in a portion of the third chamber 243, such that the second diverter 252 moves in the longitudinal direction L within the portion of the third chamber 243. Actuation of the second actuator 225 between its positions moves the second diverter 252. For example, a slider 235 may be operatively coupled to the second diverter 252 and the second actuator 225, such that actuation of the second actuator 225 moves (e.g., slides, translates, etc.) the slider 235 and in-turn moves the second diverter 252 between the first and second positions.

Figure 36:
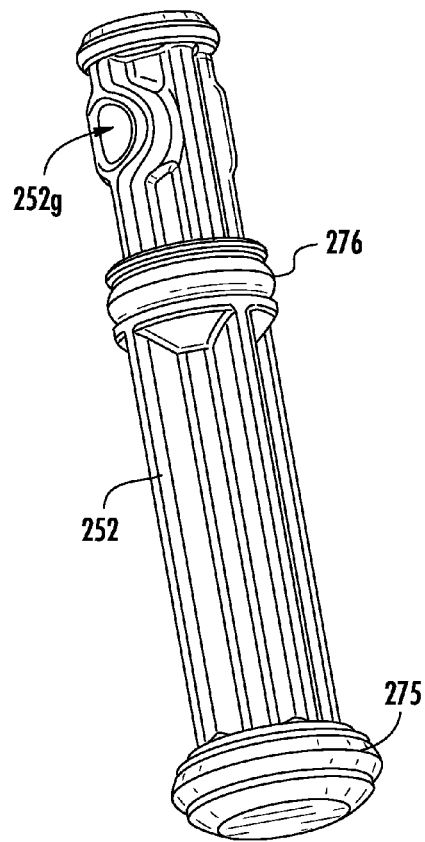
FIG. 36 is a perspective view of an exemplary embodiment of a diverter assembly of a sprayhead.

FIGS. 36-39 illustrate an exemplary embodiment of the second diverter 252. FIG. 36 also illustrates optional sealing members 275, 276 coupled to the second diverter 252, which may help form a seal between the second diverter 252 and the body 240. The second diverter 252 includes a first end 252a, a second end 252b, and a sealing portion 252c. As shown in FIGS. 6 and 7, the sealing portion 252c is configured to provide a seal between the second diverter 252 and a portion of the valve 239 (e.g., a portion of the body 240) to prevent fluid from passing beyond the seal. For example, the sealing portion 252c may seal-off the second outlet member 232 from the second chamber 242 to prevent fluid from passing from the second chamber 242 to the second outlet member 232 when the second diverter 252 is in the second position. Also, for example, the sealing portion 252c may seal-off the third chamber 243 from the second chamber 242 to prevent fluid from passing from the second chamber 242 to the third chamber 243 when the second diverter 252 is in the first position.

Figure 37:
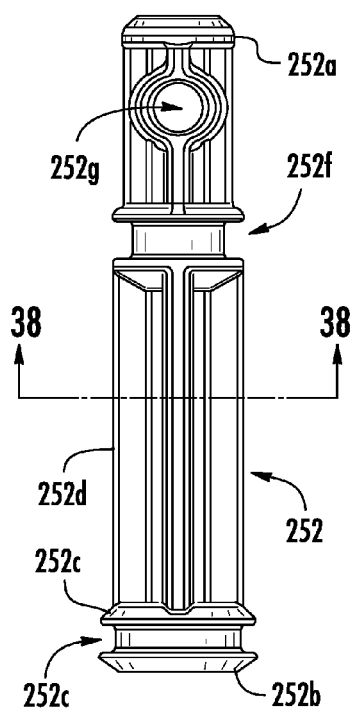
FIG. 37 is a top view of an exemplary embodiment of a diverter of a diverter assembly.
Figure 38:
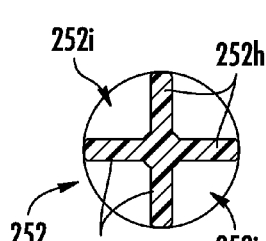
FIG. 38 is a front view the diverter of FIG. 37.
Figure 39:
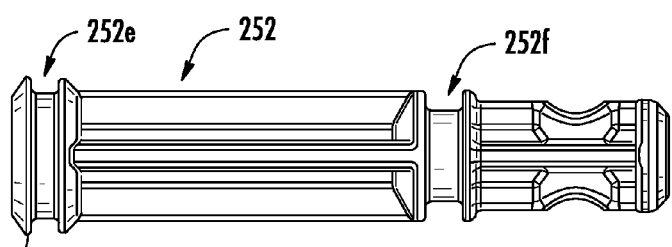
FIG. 39 is a side view the diverter of FIG. 37.
Figure 41:
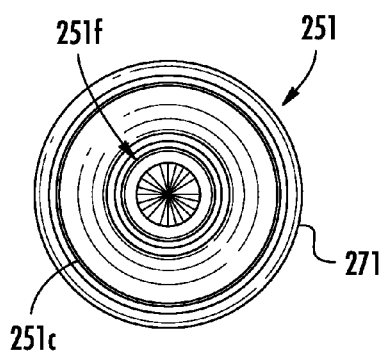
FIG. 41 is a top view of the diverter assembly of FIG. 40.
Figure 40:
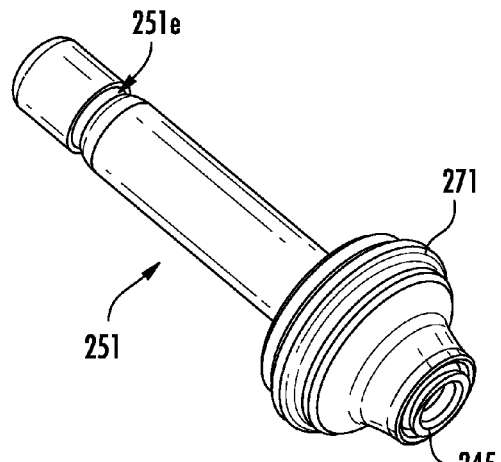
FIG. 40 is a perspective view of another exemplary embodiment of a diverter assembly of a sprayhead.

As shown in FIGS. 36-39, the second diverter 252 is configured generally as a piston (e.g., has a piston shape), with the sealing portion 252c extending away from a body 252d. The sealing portion 252c is disposed on the second end 252b of the second diverter 252 in the example shown. However, the sealing portion 252c may be provided anywhere along the body 252d between the first and second ends 252a, 252b. The sealing portion 252c has a generally cylindrical shape, conical shape, or any suitable shape that may be tailored to the geometry of the valve 239 (e.g., the body 240). As shown in FIGS. 37 and 39, the sealing portion 252c is configured as a shoulder that extends away from the body 252d, which may include an optional channel 252e provided therein. The channel 252e may be recessed into the shoulder of the sealing portion 252c, such that the sealing portion 252c has a generally C-shaped cross-section to receive the sealing member 275 in the form of an o-ring in the channel 252e. Thus, sides of the sealing portion 252c retain the sealing member 275 in the channel 252e. For the configuration including the sealing member 275, the sealing member 275 may, either alone or in cooperation with the sealing portion 252c, fluidly disconnect the third chamber 243 or the second outlet member 232 from the second chamber 242, depending on the position of the second diverter 252.

The second diverter 252 may include one or more additional channels 252f configured to receive one or more additional sealing members 276. Also shown in FIGS. 37 and 39, the second diverter includes a second channel 252f provided along the body 252d at a distance that is beyond the third chamber 243 to provide a seal between the second diverter 252 and the body 240 on the upstream side of the third chamber 243 (see FIG. 7, which shows the sealing member 276 provided to outside of the third chamber 243).

The second diverter 252 may include an opening 252g that is configured to receive a portion of the slider 235 therein to operatively couple the second diverter 252 and the slider 235. As shown in FIGS. 36 and 37, the opening 252g is disposed in the first end 252a of the second diverter 252 and has a generally cylindrical shape (e.g., having a circular cross-sectional shape). However, the shape and location of the opening 252g may be tailored to the shape and location of the slider 235 and/or the valve 239 in general.

Figure 13:
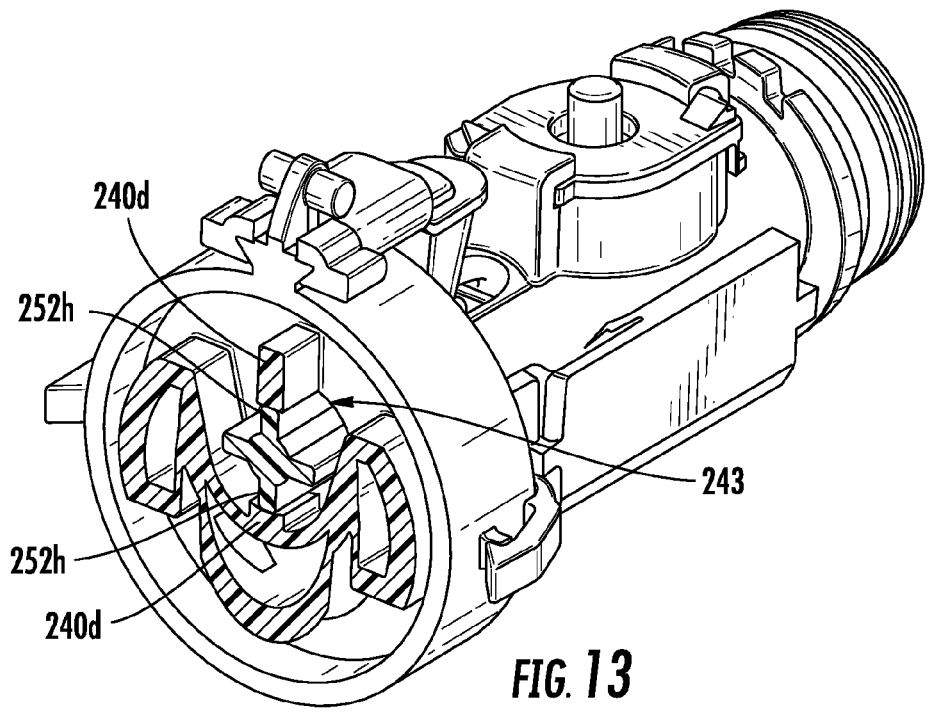
FIG. 13 is another perspective cross-sectional view of a portion of the sprayhead of FIG. 1.
Figure 14:
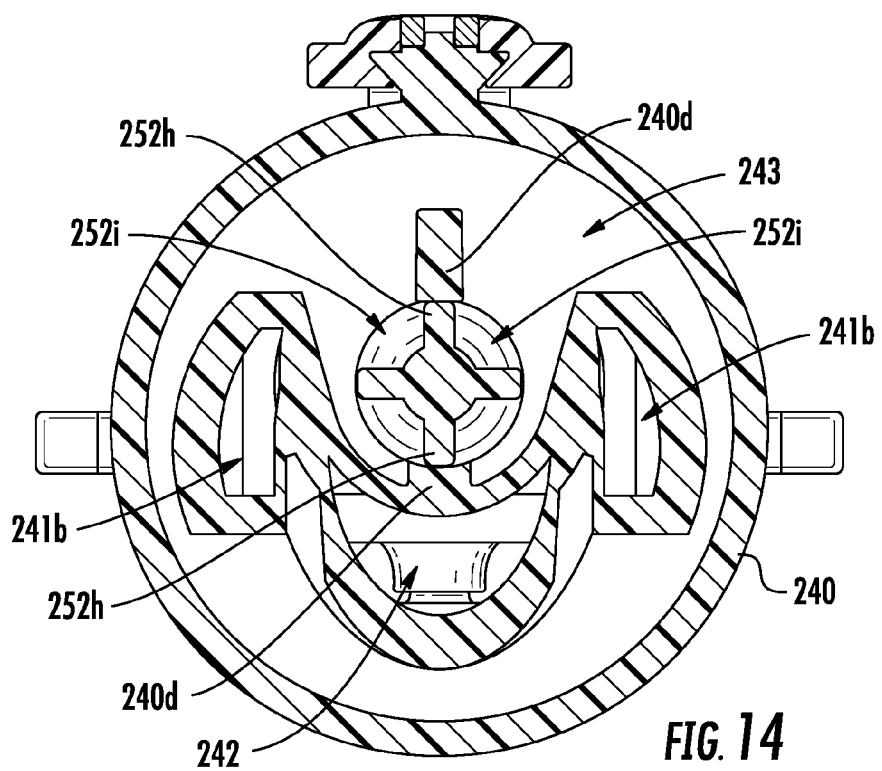
FIG. 14 is front view of the cross-section of the portion of the sprayhead of FIG. 13.
Figure 15:
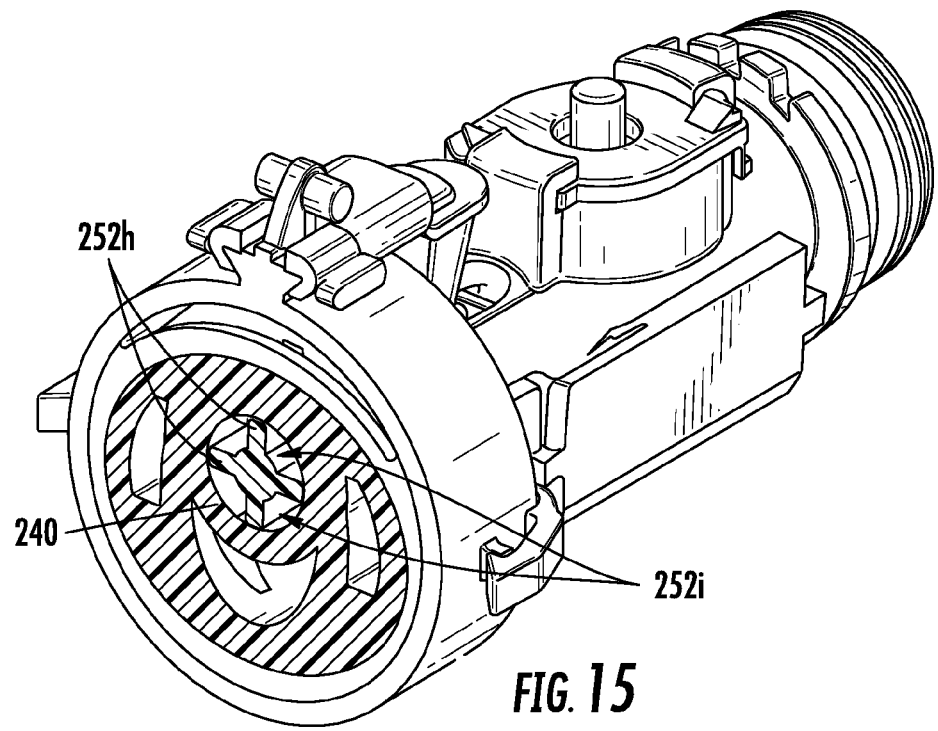
FIG. 15 is another perspective cross-sectional view of a portion of the sprayhead of FIG. 1.

The portion of the body 252d provided adjacent to the third chamber 243 may be configured having a shape that allows fluid to pass from the second chamber 242 to the third chamber 243 when the second diverter 252 is in the second position. As shown in FIG. 38, the body 252d includes a plurality of radial extending ribs 252h (e.g., members, sections, etc.) having open spaces 252i between each pair of adjacent ribs 252h. This arrangement advantageously allows fluid to flow through the open spaces 252i to the third chamber 243 when the second diverter 252 is in the second position, while providing strength and stability during movement, since the ends of the ribs 252h may be guided by portions of the body 240. FIGS. 13 and 14 show opposing guide portions 240d of the body 240 that guide the ends of the opposing ribs 252h, as well as the fluid connection between the open spaces 252i and the third chamber 243. As shown, the body 240 may include an open section (e.g., along the longitudinal axis L) around the body 252d of the second diverter 252, such that all of the open spaces 252i are fluidly connected to the third chamber 243. As shown in FIG. 15, the body 240 may also include a closed section around the body 252d of the second diverter 252, such that all of the ends of the ribs 252h are supported by an inner surface of the body 240. Thus, the open and closed sections are provided at different locations along the longitudinal axis L.

Figure 11:
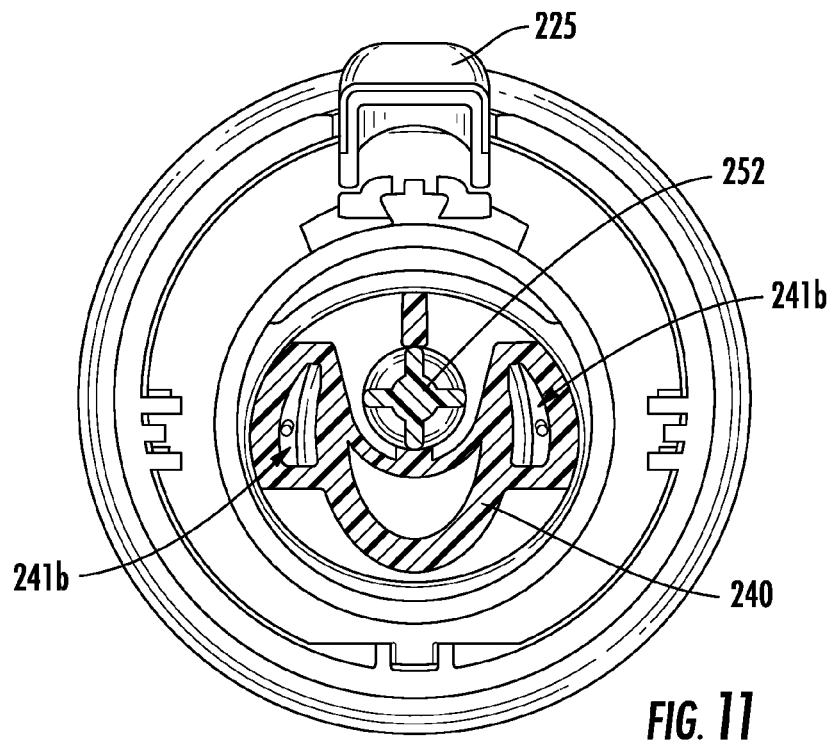
FIG. 11 is another front cross-sectional view of the sprayhead through line 11-11 of FIG. 6.
Figure 12:
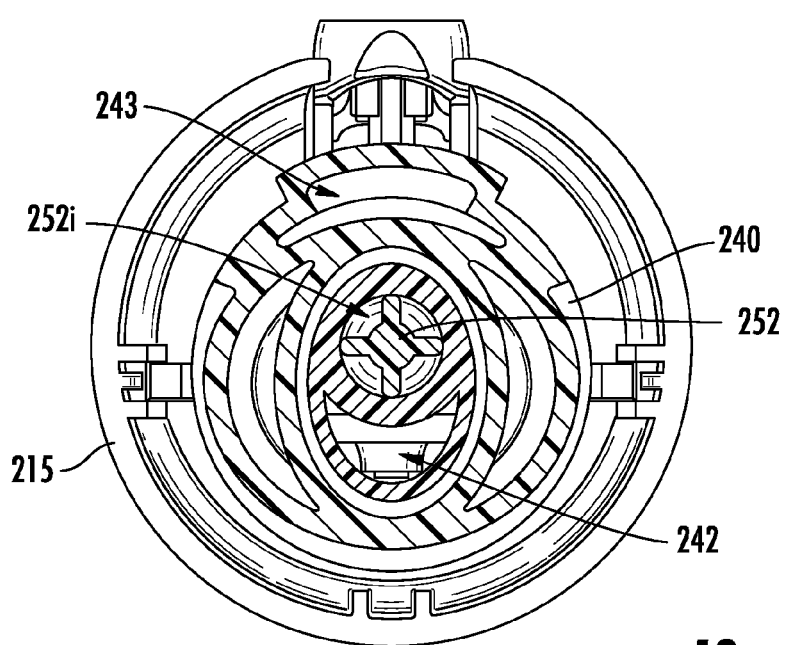
FIG. 12 is another front cross-sectional view of the sprayhead through line 12-12 of FIG. 6.
Figure 16:
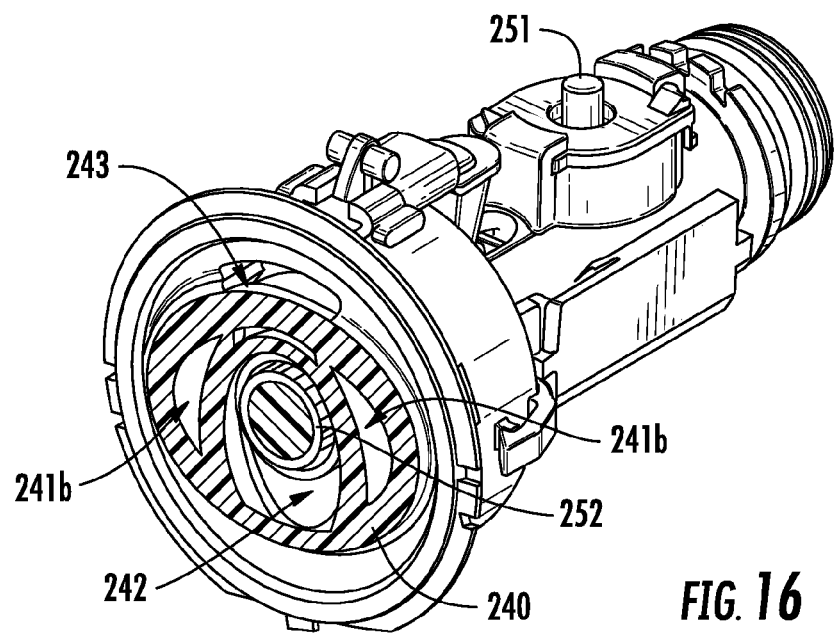
FIG. 16 is another perspective cross-sectional view of a portion of the sprayhead of FIG. 1.
Figure 17:
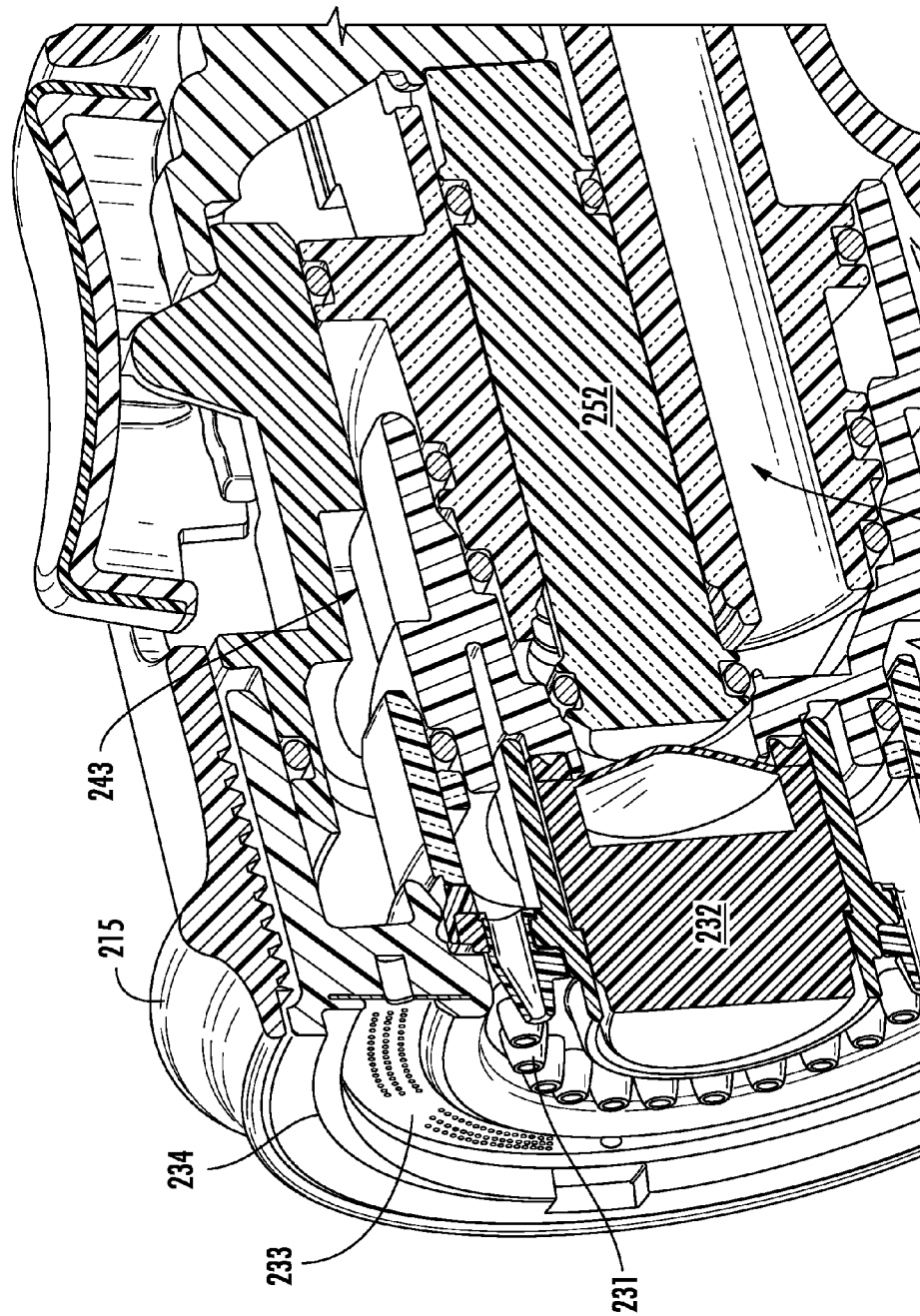
FIG. 17 is a perspective cross-sectional view of a portion of the sprayhead of FIG. 1.

FIGS. 11-17 illustrate various cross-sectional views to further illustrate the fluid flow through the sprayhead 210, such as the body 240. FIG. 11 shows the second portions 241b of the first chamber 241. FIG. 12 shows the second chamber 242, as well as the open spaces 252i that are fluidly connected to the third chamber 243. FIG. 16 shows the second portions 241b of the first chamber 241, the second chamber 242, the third chamber 243, the first diverter 251, the second diverter 252, and the body 240. FIG. 17 shows the first, second, and third outlet members 231, 232, 233, as well as the second and third chambers 242, 243.

The sprayhead 210 may optionally include a screen member 281 disposed in the inlet 223 to filter any debris or sediment that may pass into the inlet 223 of the sprayhead 210. As shown in FIG. 6 the screen member 281 may be disposed in the inlet 223. The screen member 281 may be a mesh screen that is configured to a predetermined size (e.g., orifice, porosity, etc.). A flow control 282 (e.g., collar) may optionally be provided adjacent to the screen member 281. The flow control 282 and/or the screen member 281 may couple to the sprayhead 210, such as to the body 240. For example, the inner surface of the body 240 defining the inlet 223 may include a detent member (e.g., raised member) that detachably secures the screen member 281 and flow control 282 in place in the inlet 223.

The sprayhead 210 may optionally include additional sealing members 277 to provide further seals in the valve 239 and/or the sprayhead 210. For example, one or more sealing members 277 may be provided between the first portion 240a and the second portion 240b of the body 240. Also, for example, one or more sealing members 277 may be provided between the second portion 240b of the body 240 and the outlet members, such as the first outlet member 231 and the third outlet member 233.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the sprayheads as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., valves, bodies, diverters, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A fluid control valve, comprising:
    a body comprising:
        an inlet configured to receive a supply of fluid;
        a first chamber;
        a second chamber; and
        a third chamber;
    a first diverter movable relative to the body between a first position and a second position, wherein when the first diverter is in the second position the first chamber is fluidly connected to the inlet and the second chamber is fluidly disconnected from the inlet, wherein when the first diverter is in the first position the second chamber is fluidly connected to the inlet and the first chamber is fluidly disconnected from the inlet:
    a second diverter movable relative to the body between a first position and a second position, wherein when the second diverter is in the second position the third chamber is fluidly connected to the second chamber, and wherein when the second diverter is in the first position the third chamber is fluidly disconnected from the second chamber:
    a first outlet fluidly connected to the first chamber;
    a second outlet; and
    a third outlet fluidly connected to the third chamber;
    wherein when the second diverter is in the first position, the second outlet is fluidly connected to the second chamber,
    and wherein when the second diverter is in the second position, the second outlet is fluidly disconnected from the second chamber.

2. The fluid control valve of claim 1, wherein at least a portion of the second diverter is disposed in a portion of the third chamber that extends in a longitudinal direction through the body, such that the second diverter moves in the longitudinal direction between the first and second positions.

3. The fluid control valve of claim 2, wherein the first chamber of the body includes a first portion that receives at least a portion of the first diverter and a second portion that is fluidly connected to the first outlet, wherein the first portion of the first chamber extends in a radial direction that is transverse to the longitudinal direction such that the first diverter moves in the radial direction between the first and second positions, and wherein the second portion of the first chamber extends at an angle relative to the first portion.

4. The fluid control valve of claim 3, further comprising a biasing member that biases the first diverter from the second position toward the first position.

5. The fluid control valve of claim 4, wherein the first diverter has a first end configured to couple to a first actuator and a second end having a bore that receives a post of the body, and wherein the biasing member is disposed in the bore between the post and the second end of the first diverter.

6. The fluid control valve of claim 5, further comprising a sealing member disposed in a channel of a shoulder on the second end of the first diverter, wherein when the first diverter is in the second position the second chamber is fluidly disconnected from the inlet by the sealing member and first diverter, and wherein when the first diverter is in the first position the first chamber is fluidly disconnected from the inlet by the sealing member and the first diverter.

7. The fluid control valve of claim 2, wherein the second diverter includes a first end and a second opposing end configured to couple to a second actuator configured to move the second diverter between the first and second positions.

8. The fluid control valve of claim 7, further comprising a sealing member disposed in a channel of a shoulder on the first end of the second diverter, wherein when the second diverter is in the second position the second outlet is fluidly disconnected from the second chamber by the sealing member and the second diverter, and wherein when the second diverter is in the first position the third chamber is fluidly disconnected from the second chamber by the sealing member and the second diverter.

9. The fluid control valve of claim 1, wherein the first diverter extends in and moves in a first direction relative to the body, the second diverter extends in and moves in a second direction relative to the body, and the first direction is transverse to the second direction.

10. The fluid control valve of claim 9, wherein the second direction corresponds to a longitudinal direction extending between the inlet and the second outlet, and wherein at least a portion of the second diverter is disposed in a portion of the third chamber that extends in the longitudinal direction through the body, such that the second diverter moves in the longitudinal direction between the first and second positions.

11. A fluid control valve, comprising:
    a body comprising:
        an inlet configured to receive a supply of fluid;
        a first chamber;
        a second chamber; and
        a third chamber;
    a first diverter movable relative to the body between a first position and a second position, wherein when the first diverter is in the second position the first chamber is fluidly connected to the inlet and the second chamber is fluidly disconnected from the inlet, wherein when the first diverter is in the first position the second chamber is fluidly connected to the inlet and the first chamber is fluidly disconnected from the inlet;
    a second diverter movable relative to the body between a first position and a second position, wherein when the second diverter is in the second position the third chamber is fluidly connected to the second chamber, and wherein when the second diverter is in the first position the third chamber is fluidly disconnected from the second chamber;

wherein the first diverter extends in and moves in a first direction relative to the body, the second diverter extends in and moves in a second direction relative to the body, and the first direction is transverse to the second direction.

12. The fluid control valve of claim 11, wherein the second direction corresponds to a longitudinal direction, and the first direction corresponds to a radial direction from the longitudinal direction.

13. The fluid control valve of claim 11, wherein the body comprises:
   a first portion defining the inlet, a connector for coupling the valve to a member, the first chamber, and the second chamber; and
   a second portion defining the third chamber with the first portion.

14. The fluid control valve of claim 13, wherein the member is a supply hose for supplying water to the fluid control valve, and the first and second portions of the body are formed separately then coupled together.

15. The fluid control valve of claim 13, wherein the second portion comprises:
   a circular shaped inlet;
   a first elliptical section that is provided around the inlet and extends from a base away from the inlet;
   a second elliptical section provided around and extending from the first elliptical section away from the inlet; and
   a first circular section provided around and extending from the second elliptical section away from the inlet.

16. The fluid control valve of claim 15, wherein the first elliptical section has a major axis that extends in a radial direction and a minor axis that extends in a second direction that is transverse to the radial direction, the first elliptical section defines the second chamber together with the base and the first portion.

17. The fluid control valve of claim 16, wherein the second elliptical section has a major axis that extends in the second direction and a minor axis that extends in the radial direction, and the second elliptical section defines the second portion of the first chamber either alone or in combination with the first elliptical section.

18. The fluid control valve of claim 17, wherein the first circular section has a major axis that extends in the radial direction and a minor axis that extends in the second direction, and the first circular section defines the third chamber either alone or in combination with the second elliptical section.

19. The fluid control valve of claim 13, wherein the second portion includes a pivot about which a second actuator pivots to move the second diverter between the first and second positions.

* * * * *